US009503438B2

United States Patent
Choyi et al.

(10) Patent No.: US 9,503,438 B2
(45) Date of Patent: Nov. 22, 2016

(54) CHARACTERISTICS OF SECURITY ASSOCIATIONS

(71) Applicant: InterDigital Patent Holdings, Inc., Wilmington (DE)

(72) Inventors: Vinod Kumar Choyi, Norristown, PA (US); Yogendra C Shah, Exton, PA (US); Michael V Meyerstein, Martlesham Heath (GB); Louis J Guccione, East Chester, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 163 days.

(21) Appl. No.: 13/940,794

(22) Filed: Jul. 12, 2013

(65) Prior Publication Data

US 2014/0201809 A1  Jul. 17, 2014

Related U.S. Application Data

(60) Provisional application No. 61/671,419, filed on Jul. 13, 2012.

(51) Int. Cl.
*H04L 29/06* (2006.01)
*H04W 12/06* (2009.01)

(52) U.S. Cl.
CPC .......... *H04L 63/08* (2013.01); *H04L 63/0807* (2013.01); *H04L 63/105* (2013.01); *H04L 63/205* (2013.01); *H04W 12/06* (2013.01); *H04L 63/0876* (2013.01); *H04L 2463/081* (2013.01)

(58) Field of Classification Search
None
See application file for complete search history.

(56) References Cited

U.S. PATENT DOCUMENTS 7,716,723 B1 * 5/2010 Taylor ................... H04L 63/08
380/273
7,934,101 B2   4/2011 Stieglitz et al.
(Continued)

FOREIGN PATENT DOCUMENTS

JP   2006-215795   8/2006
JP   2007-065824   3/2007
(Continued)

OTHER PUBLICATIONS

IETF, RFC 2617: "HTTP Authentication: Basic and Digest Access Authentication", Jun. 1999, 32 pages.
(Continued)

*Primary Examiner* — Christopher Revak
(74) *Attorney, Agent, or Firm* — Baker & Hostetler LLP

(57) ABSTRACT

Authentication of a user or a wireless transmit/receive unit may be based on an obtained measure of authentication strength, which may referred to as an assurance level. For example, a user, via a WTRU, may request access to a service controlled by an access control entity (ACE). The user may be authenticated with a user authenticator and assertion function (UAAF), producing a result. A user assertion may be provided that includes the user authentication result, a user assurance level, and/or a user freshness level. The WTRU may be authenticated with a device authenticator and assertion function (DAAF), producing an associated result. A device assertion may be provided that may include the device authentication result, a device assurance level, and/or a device freshness level. The assertions may be bound together to receive access to a service or resource.

31 Claims, 11 Drawing Sheets

(56) References Cited

U.S. PATENT DOCUMENTS

| | | | |
|---|---|---|---|
| 8,056,116 B2 | 11/2011 | Katoh et al. | |
| 8,630,620 B2* | 1/2014 | Cha | H04L 63/04 380/247 |
| 8,756,427 B2* | 6/2014 | Shah | G06F 21/725 713/168 |
| 8,769,607 B1* | 7/2014 | Jerdonek et al. | 726/1 |
| 2002/0044552 A1* | 4/2002 | Vialen | H04L 63/08 370/389 |
| 2005/0235341 A1* | 10/2005 | Stieglitz et al. | 726/5 |
| 2006/0002342 A1* | 1/2006 | Lin | 370/331 |
| 2006/0053296 A1* | 3/2006 | Busboom et al. | 713/182 |
| 2009/0187983 A1* | 7/2009 | Zerfos | H04L 63/0823 726/10 |
| 2010/0027542 A1 | 2/2010 | Shibi et al. | |
| 2011/0066856 A1* | 3/2011 | Yao | H04L 9/3271 713/170 |
| 2011/0083169 A1 | 4/2011 | Moeller et al. | |
| 2012/0077461 A1* | 3/2012 | Das | H04L 63/0884 455/410 |
| 2012/0284783 A1* | 11/2012 | Jakobsson | 726/6 |
| 2013/0288668 A1* | 10/2013 | Pragada | H04W 12/06 455/426.1 |
| 2014/0068733 A1* | 3/2014 | Belisario et al. | 726/6 |
| 2014/0181922 A1* | 6/2014 | Jakobsson | 726/5 |
| 2014/0282939 A1* | 9/2014 | Pieczul et al. | 726/6 |
| 2015/0003320 A1* | 1/2015 | Anderson et al. | 370/328 |

FOREIGN PATENT DOCUMENTS

| | | |
|---|---|---|
| JP | 2010-502109 | 1/2010 |
| JP | 2010-519657 | 6/2010 |
| JP | 2012-059287 | 3/2012 |
| KR | 10 20050101193 A | 10/2005 |
| KR | 10 0927322 B1 | 11/2009 |
| WO | WO 2003-052630 A2 | 6/2003 |
| WO | WO 2004-071103 A2 | 8/2004 |
| WO | WO 2008-024454 | 2/2008 |
| WO | WO 2012/040198 A1 | 3/2012 |
| WO | WO 2013/003535 A1 | 1/2013 |

OTHER PUBLICATIONS

IETF, RFC 5705: "Keying Material Exporter for Transport Layer Security (TLS)", Mar. 2010, 8 pages.

3GPP TS 33.220: "Generic Authentication Architecture (GAA); Generic Bootstrapping Architecture" Mar. 2005, 39 pages.

3GPP TS 33.203: "3G Security, Access security for IP-based services" Dec. 2009, 114 pages.

3GPP TR 33.924: "Identity management and 3GPP security interworking; Identity management and Generic Authentication Architecture (GAA) interworking" Sep. 2012, 40 pages.

3GPP TR 33.804: "Single Sign on (SSO) application security for Common IP Multimedia Subsystem (IMS) based Session Initiation Protocol (SIP) Digest" Jun. 2012, 47 pages.

3GPP TS 33.259: "Key Establishment between a UICC hosting device and a remote device" Dec. 2009, 28 pages.

NIST SP 800-63-1: "Electronic Authentication Guideline", Dec. 2011, 121 pages.

3GPP: "3rd Generation Partnership Project; Technical Specification Group Services and System Aspects; Study on Service aspects of integration of Single Sign-On (SSO) frameworks with 3GPP operator-controlled resources and mechanisms (Release 12)", TR 22.895 v12.0.0, Mar. 14, 2012.

Conor P Cahill et al., "Client-based authentication technology", Digital Identity Management, ACM, Oct. 21, 2011, pp. 83-92.

Shiraki et al, "Access Control method Using Multi Element Authentication", Proceedings of the 2012 IEICE General conference, Basics and Boundary, p. 172, Mar. 6, 2012.

Japanese Application No. 2015-521845: Notice of Rejection dated Apr. 5, 2016, 7 pages.

Korean Application No. 10-2015-7003869: Notice of Allowance dated Jul. 23, 2016, 1 page.

\* cited by examiner

CHARACTERISTICS OF SECURITY ASSOCIATIONS

CROSS REFERENCE TO RELATED APPLICATIONS

This application claims the benefit of U.S. Provisional Patent Application Ser. No. 61/671,419 filed Jul. 13, 2012 the contents of which is hereby incorporated by reference in their entirety.

BACKGROUND

Authentication for a mobile device, (e.g., a mobile phone) often includes a challenge and response mechanism that may leverage a shared secret stored in the device's universal integrated circuit card (UICC). Some authentications do not involve the user to make the user's experience seamless. Such authentications assume that the rightful owner has possession of the UICC which is stored within the device. If the device is lost or stolen, for example, it may still be used because the network may be authenticating the subscription rather than the user (or subscriber) of the device (or service). The use of devices by an unauthorized user may be mitigated by involving the user in each session that requires authentication. For example, sessions may request the user to input a password and/or pin. Such sessions often make the user's authentication experience cumbersome, and users may respond with weak passwords and/or pins (e.g., 1234 or aaaa). Such pins and passwords are easy to remember and input which may make the passwords easy to guess. Weak passwords and pins often increase the authentication burden for the user to access a service or application without adding security for the user. In addition, services are not equally sensitive from a security risk perspective, and thus services may require different levels of security.

SUMMARY

Systems, methods and apparatus embodiments are described herein for authenticating a user of a wireless transmit/receive unit (WTRU), which may be referred to as a user equipment (UE) without limitation. For example, a WTRU may obtain a measure of a strength of a user authentication and generate an assertion based on the user authentication strength measure. Based on the assertion, a user of the WTRU may receive access to a resource via the WTRU. The assertion may include an indication of a freshness of the user authentication. The WTRU may further obtain a measure of a strength of a WTRU (e.g., a device in the possession of a user) authentication, and the WTRU may generate the assertion further based on the WTRU authentication strength measure. In addition, the assertion may include an indication of a freshness of the WTRU authentication. The assertion may include a plurality of user authentication factors or a plurality of WTRU (or other device) authentication factors. Further, the assertion may be a negative assertion and thus the received access, based on the negative assertion, may be limited.

In one embodiment, a user, via an WTRU, requests access to a service controlled by an access control entity (ACE). The user is authenticated with a user authenticator and assertion function (UAAF), producing a result. A user assertion is provided, to the ACE, that includes the user authentication result and a user assurance level that is associated with the user authentication. The user assertion may further include a user freshness level that corresponds to the user authentication. The WTRU is authenticated with a device authenticator and assertion function (DAAF), producing an associated device authentication result. A device assertion may be provided, to the ACE, that includes the device authentication result and a device assurance level that is associated with the device authentication. The device assertion may further include a device freshness level that corresponds to the device authentication. The assertions may be bound together to create a bounded assertion. The bounded assertion may be provided to the ACE so that the user, via the WTRU, receives access to the requested service.

In another example embodiment, an assertion may comprise a negative assertion. A negative assertion may indicate that an authentication failed. For example, a negative user assertion may indicate that the result of the authentication between the user and the UAAF is negative. In response to a negative assertion, a user and/or a WTRU may receive limited access or no access to a service. Limited access may be granted based on stored assurance and freshness levels. Limited access may refer to an access that is greater than no access, but less than limitless access. A positive assertion may indicate that an authentication was successful. For example, a positive user assertion may indicate that the user was authentication with the UAAF, producing a positive result. The result of the authentication between the user and the UAAF may be based on multiple authentication factors. For example, authentication factors may comprise information indicative of knowledge of the user, one or more physiological characteristics of the user, and/or one or more behavioral characteristics of the user. Authentication factors may also comprise characteristics of the UE.

In yet another example embodiment, a user and/or UE may receive limited access to a service if an assurance level and/or a freshness level is not within an acceptable range, or the user and/or WTRU may be re-authenticated because a freshness level is unacceptable (e.g., credentials may have expired). The acceptable range (or threshold) of each level may be based on one or more policies determined by a service provider that provides a service. The service provider may be controlled by an ACE and may provide a user/WTRU with a service. In another example embodiment, the UAAF and the DAAF may function as a single AAF. The UAAF and the DAAF may be co-located with each other or they may be located separately. For example, a UAAF may reside on a WTRU and a DAAF may be co-located with an ACE on a server of the network. The AAF may send a single assertion to the ACE that combines the user authentication result that was received from the UAAF and the device authentication result that was received from the DAAF. In another example embodiment, the AAF may reside separately from the UAAF and DAAF, wherein the AAF manages and maps the identities of the user and the device, and invoke the UAAF and the DAAF for performing user authentication and device authentication, respectively. The AAF may function in a role similar to a Master Identity Provider (IdP), which refers to an IdP that may combine authentication results from various identity providers. Thus, the AAF may combine the results of the authentications received from the UAAF and the DAAF and provide a single assertion to the ACE along with the corresponding assurance and freshness levels.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
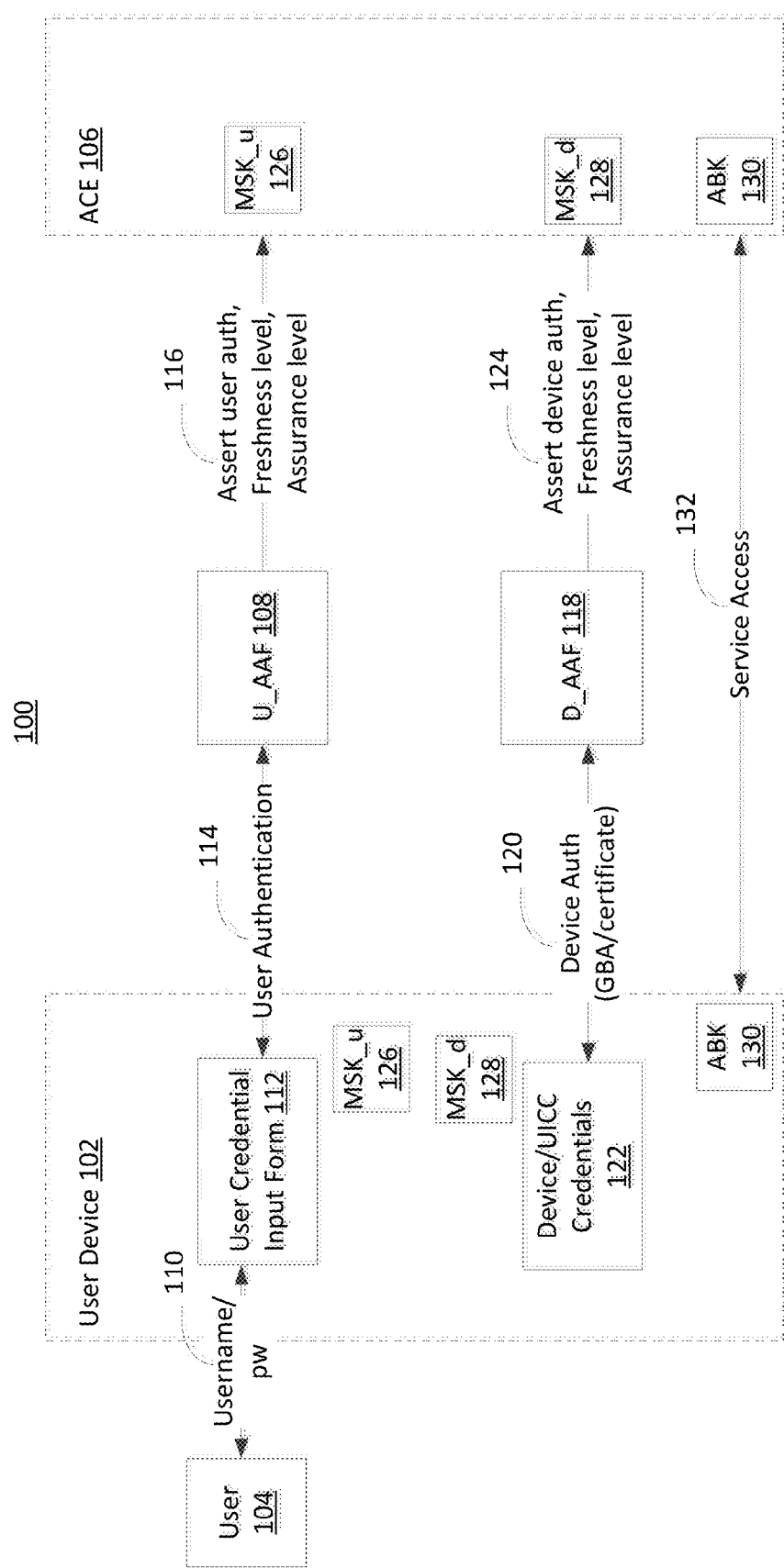
FIG. 1 is a block diagram of a system that implements match-on-server authentication according to an example embodiment.

The ensuing detailed description is provided to illustrate exemplary embodiments and is not intended to limit the scope, applicability, or configuration of the invention. Various changes may be made in the function and arrangement of elements and steps without departing from the spirit and scope of the invention.

As described herein, characteristics of a security association may be provided to a service providing entity, which can also be referred to as a service provider (SP), for authentication or re-authentication. Such characteristics may be provided by using a locally-determined process and/or a network-assisted process. In an embodiment, existing or expired characteristics of a security association may be exploited for a user equipment (UE) to re-authenticate and/or re-key to a SP. The term user equipment (UE), as used herein, may refer to any appropriate wireless transmit/receive unit (WTRU) or device that is connected to a network service, without limitation. Such re-authentication or re-keying may provide the UE with limited or limitless access to a service that is provided by the SP. Services may also be referred to as resources, without limitation, and thus a SP may also be referred to as a resource provider.

In an example embodiment described herein, characteristics, which may also be referred to as parameters or security attributes, that describe a security association are created, stored, retrieved, and communicated. A security association may refer to security attributes that are shared between at least two network entities to support secure communication between the network entities. For example, a UE and an SP (e.g., a website) may have a specific security association with each other. Example parameters of a security association include, but are not limited to, a parameter that indicates freshness of the security association, a parameter that indicates the assurance level of the security association, a parameter that indicates authentication factors used in creating the security association, and parameters that describe the storage and/or retrieval of the security association. As described herein, characteristics (parameters) may be derived and/or stored locally on the UE. In an example embodiment, the derivation of characteristics (parameters) is network-assisted. In another example embodiment described herein, negative assertions used to provide limited access (e.g., to a service) may be based on assurance and/or freshness levels.

As used herein, an assurance level may refer to a measure of an authentication strength. For example, an assurance level may correspond to a user authentication and/or a device authentication, and an assurance level may at least partially be determined by a number of authentication factors. A freshness level may refer to an indication of an authentication freshness. For example, a freshness level may be based on the time that an authentication occurred. A freshness level may correspond to a user authentication and/or a device authentication.

By way of example, users who do not want to remember or enter passwords, may store passwords (e.g., username passwords) in a browser for browser-based application authentication. Such stored passwords may authenticate the browser instead of the user. In single sign-on (SSO) implementations, a user's access to a service (or services) may be reduced if the identity provider (IdP) service is unavailable or is un-reachable from the resource provider side or from the user side.

In various embodiments described herein, one or more identity providers (IdPs) may perform an authentication and assertion function (AAF) that is required to authenticate the user (e.g., using what the user knows, what the user has, and/or what the user is). A service provider's decision to grant access to a service may be based on policies governed by the SP. Such an SP may be controlled by an access control entity (ACE) such as, for example, a Network Application Function (NAF) or a Relying Party (RP)/Client. The service provider may require multiple factors of authentication and/or a subset of the possible factors of authentication.

In an example embodiment, the user and/or the UE may be required to provide, to the ACE, certain characteristics about the user and/or UE authentication (e.g., assurance levels, freshness levels, the resulting security association, or the like). Such an embodiment may provide flexibility because, for example, the user and/or UE may not have to go through the complete authentication and may assert an earlier-performed authentication that includes the appropriate freshness levels and/or assurance levels.

Described herein is an authentication and assertion function (AAF) which performs an authentication protocol that asserts an identity. The AAF may also provide (e.g., to the ACE) the assurance level and the freshness level which correspond to the authentication protocol. In accordance with an example embodiment, the AAF is capable of authenticating using factors such as, but not limited to: information the user may know (e.g., knowledge-based authentication); the user's physiological characteristics; the user's behavioral characteristics; and possessions of the user (e.g., device, UE, hardware tokens, UICC, or the like). In order for an ACE to grant a user and/or a UE access to a service, the aforementioned authentication factors or a combination thereof may be performed, and the assurance levels and the freshness levels associated with each authentication may be conveyed by the AAF to the ACE.

Authentications and assertions may be implemented differently based on capabilities of a device or capabilities of the serving network. For example, "match-on-server" implementations and "match-on-device" implementations are described herein. Other embodiments are based on a combination of "match-on-device" and "match-on-server" implementations. Match-on-server refers to the manner in which web-based authentications or remote authentications are carried out. Authenticating to a web server and authenticating to a mail server are examples of match-on-server implementations.

In an example embodiment that implements a match-on server implementation, the AAF is located on the network (e.g., on a server). In an embodiment that implements a match-on-device implementation, the AAF is located locally on a device, which may be referred to as a wireless transmit/receive unit (WTRU) or an UE. In another embodiment, the local authentication function may be a proxy for a network server based function which is provisioned by the network server entity. In an example embodiment, upon a successful authentication by the AAF, the AAF asserts the identity of an entity (e.g., the user or the device) to the ACE. The AAF may provide an assurance level and/or a freshness level which correspond to the authentication (e.g., to the ACE). If there is an unsuccessful authentication, for example, the results of the unsuccessful authentication may be conveyed to the ACE. The ACE may use such results to log unsuccessful attempts by an entity (e.g., user or device), and future service requests from that entity may be based on the logged unsuccessful attempts.

FIG. 1 is a block diagram of a system 100 that implements match-on-server authentication according to an example embodiment. Referring to FIG. 1, a user device 102 may be used by a user 104 to request, from an ACE 106, access to a service. The ACE 106 may require that the user 104 and the device 102 are authenticated before service access is granted.

In accordance with the illustrated embodiment, a user authenticator and assertion function (U_AAF) 108 is used to authenticate and assert the user's identity to the ACE 106. For example, referring to 110, the user 104 enters a username/password in a user credential input from 112 that is hosted by the device 102. At 114, the user 104 is authenticated by the U_AAF 108, based on the credentials that were entered in the user credential input form 112. At 116, the user authentication is asserted to the ACE 106. In addition, the freshness level and/or the assurance level corresponding to the user authentication may be conveyed to the ACE 106 via the U_AAF 108, at 116. In example embodiment, the U_AAF 108 is implemented by an IdP, such as an OpenID Identity Provider (OP) for example, although it will be understood that the U_AAF may be implemented by other entities as desired. For example, the U_AAF 108 may be implemented by an entity within an OP such as, for example, www.google.com or www.facebook.com. In another example embodiment, a mobile network operator (MNO) (e.g., AT&T, Deutsche Telecom, etc.) functions as an IdP and hosts the U_AAF 108.

In accordance with the illustrated embodiment, a device authenticator and assertion function (D_AAF) 118 may be used to authenticate and assert the identity of the device 102 to the ACE 106. For example, referring to 120, the device 102 is authenticated with the D_AAF 118 using one or more device/UICC credentials 122. As illustrated, the device 104 is authenticated using a Generic Bootstrapping Architecture (GBA) protocol or certificate, although it will understood that the device 104 may be authenticated using other authentication protocols as desired. At 124, the device authentication is asserted to the ACE 106. In addition, the assurance level and/or the freshness level corresponding to the device authentication may be conveyed to the ACE 106 via the D_AAF 118, at 124. The bootstrapping server function (BSF) or the Network Application Function (NAF), defined as part of the Generic Bootstrapping Architecture (GBA), may implement the D_AAF 118, although it will be understood that embodiments are not so limited. In an example embodiment, the D_AAF 118 is located within an operator network (e.g., AT&T, Verizon, Deutsche Telecom, or the like). In another example embodiment, a device IdP (e.g., Apple) hosts and provides the D_AAF 118 and vouches for the identity of the device 102 (e.g., an iPhone). A device IdP may host and provide the D_AAF 118, for example, if trust exists between the device IdP and the device 102 and between the device IdP and the ACE 106.

A single entity may implement the U_AAF 108 and the D_AAF 118, and thus the entity may be referred to as authenticator and assertion function (AAF). An AAF may perform multiple authentications (e.g., knowledge-based, device-based, physiological, behavioral, or the like). In accordance with an example embodiment, an AAF performs the U_AAF 108 and the D_AAF 118, and the AAF binds the functions together to provide a single assertion, assurance level, and freshness level. In an example embodiment described herein, the U_AAF 108 and the D_AAF 118 are part of the same network as each other. In an alternative embodiment, the U_AAF 108 is part of a network that is different than a network that contains the D_AAF 118. The AAF may send a single assertion to the ACE that combines both the user authentication result that was received from the UAAF and the device authentication result that was received from the DAAF. In another embodiment, the AAF resides separately from the UAAF and DAAF, wherein the AAF manages and maps the user identity and the device identity, and invokes the UAAF and the DAAF for performing user authentication and device authentication, respectively. The AAF may function like a master Identity Provider (IdP). For example, the AAF may combine the results of the authentications received from the UAAF and the DAAF to provide a single assertion to the ACE. The assertion may be provided with associated assurance and freshness levels. In another example embodiment, the U_AAF 108 and the D_AAF 118 are located within the same entity. Further, the U_AAF 108 and the D_AAF 118 may be part of the same network as the ACE 106. In various example embodiments described herein, the U_AAF 108 and the D_AAF 118 are entities that are trusted by the ACE 106. In an alternative embodiment, the AAF may be the only entity that is trusted by the ACE 106, while the AAF has trust relationships with the U_AAF 108 and the D_AAF 118. Assertion messages, for example the assertion message at 116 and 124 in FIG. 1, which are communicated between the AAF and the ACE 106, may be protected or they may be sent without security protection.

Figure 2:
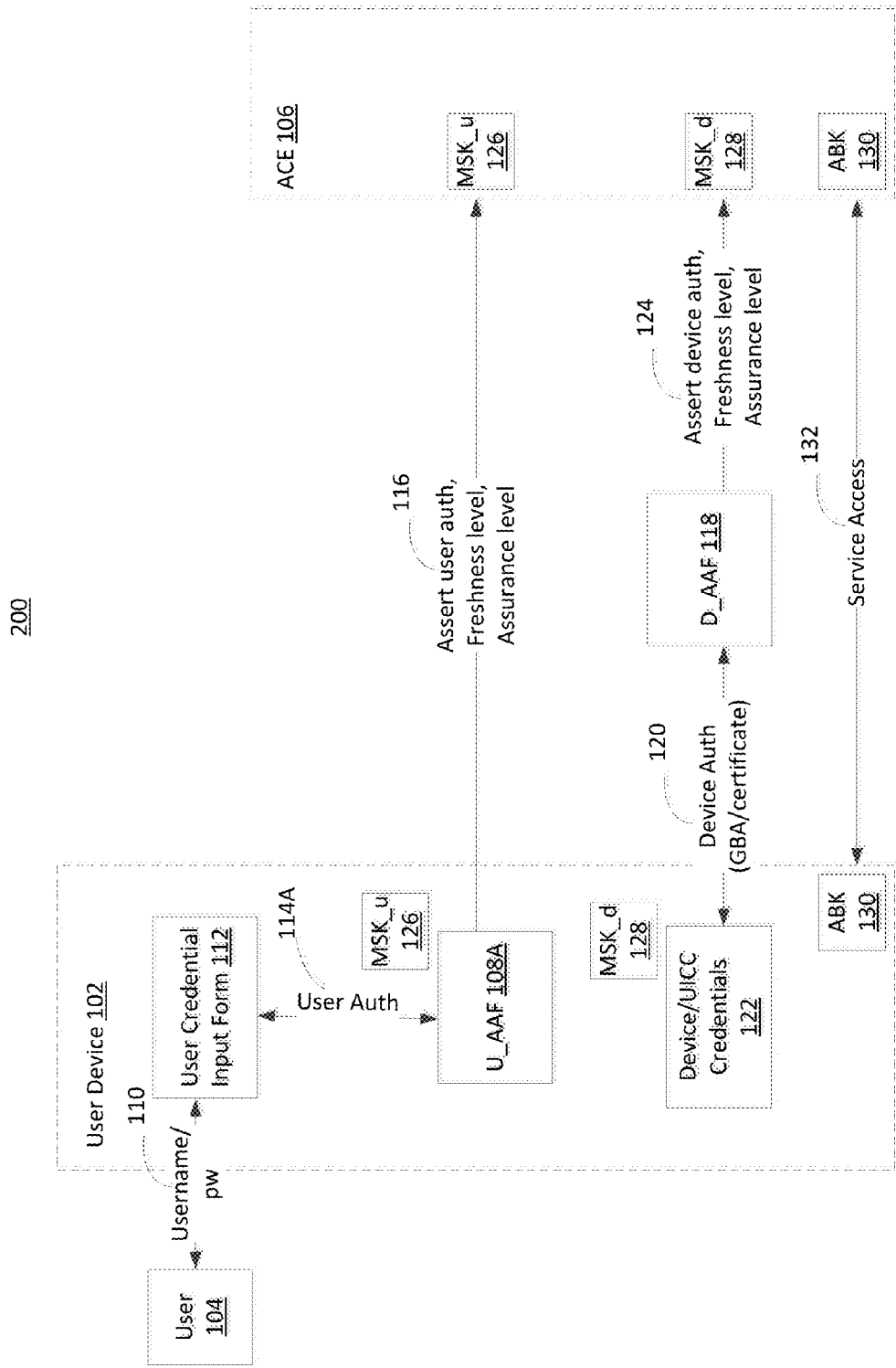
FIG. 2 is a block diagram of a system that implements a combination of match-on-server and match-on-device based authentications in accordance with an example embodiment.

FIG. 2 is a block diagram of a system 200 that implements a combination of match-on-server and match-on-device based authentications in accordance with an example embodiment. Reference numbers in FIG. 2 are repeated from FIG. 1 to show that the system 200 is similar to the system 100, although the U_AAF 108A in system 200 resides on the device 102 instead of residing on the network as it does in system 100 shown in FIG. 1. Referring to the illustrated embodiment (system 200) shown in FIG. 2, the D_AAF 118 resides on the network. The U_AAF 108A performs a local authentication that authenticates the user 104, at 114A. The user 104 may be authenticated based on various factors such as, but not limited to, a username and/or password, physiological characteristics of the user, behavioral characteristics of the user, or the like. At 116, the results of the user authentication performed at 114A are asserted by the U_AAF 108A. The results may be asserted with their associated freshness and assurance levels. The U_AAF 108A may be implemented as a proxy function for a network based AAF and may be provisioned on the UE 104 using a provisioning process such that the U_AAF 108A acts as a local authenticator function on behalf of the network based AAF. In accordance with the illustrated embodiment, at 124 in the system 200, the D_AAF 118 asserts the device authentication results with their associated assurance and freshness levels independently from the U_AAF assertions. Alternatively, an AAF may combine the results received from U_AAF and D_AAF and provide a single assertion with corresponding assurance and freshness levels to the ACE 106.

Assertions may be positive assertions or negative assertions. Positive assertions may refer to assertions that validate and vouch for the identity of an entity. Positive assertions may imply that the authentication of an identity was successful (positive). Such an identity may represent a user, a device, a UICC, or the like. A positive assertion may carry one or more tokens that are used to retrieve a master session key (MSK). Alternatively, the assertions themselves may carry the MSK. For example, a token may comprise an MSK. When a positive assertion is received from the U_AAF 108, the key that is provided may be referred to as a user master session key (MSK_u), such as the MSK_u 126 shown in FIGS. 1 and 2. In device authentication with a positive assertion, the key that is provided may be referred to as a device master session key (MSK_d), such as the MSK_d 128 shown in FIGS. 1 and 2. As described further below, the user and device authentications may be bound to generate an authentication binding key (ABK). For example, with continuing reference to FIGS. 1 and 2, the MSK_u 126 and the MSK_d 128 are bound to generate an ABK 130. Based on the ABK 130, the user 104 and the UE 110 are granted and receive access to a service at 132.

The ABK 130 may be generated via a process which is dependent upon the generation of the MSK_d 128 and the MSK_u 126, thus the ABK 130 may be bound to the MSK_d 128 and the MSK_u 126. For example, when generating the MSK_d 128, a nonce may be used in the protocol run with the D_AAF 118. The same nonce may also be used in the protocol run with the U_AAF 108. The ABK may be derived from a key derivation function which takes as input both MSK_d and MSK_u.

In an example embodiment, upon successful authentication, the respective AAF asserts the authentication result to the ACE 106. The assertion may include variable assurance levels in order to quantify the strength of the authentication. For example, in generating the user authentication assurance level, a password-based authentication may warrant a lower assurance level than a biometric fingerprint-based authentication. The authentication result may be encapsulated into an assertion token which may include the authentication assurance level, a freshness level (e.g., a time value indicating when the authentication was performed), and/or other parameters. The assertion token may be signed by the respective AAF so that the ACE 130 can verify the authenticity of the information in the assertion token. In another example embodiment, the U_AAF 108 and D_AAF 118 may be co-located on the same entity, which may be referred to as an AAF, and one assertion token is generated the AAF generates the ABK 130. Thus, the ACE 106, upon successful verification of the information in the assertion token, may provision services to the user 104. The ABK 130 may be retrieved from the AAF by the ACE 106. Alternatively, the ABK 130 may be generated from the MSK_d 128 and the MSK_u 126. At 132, the ABK 130 is used to secure communications between the UE 102 and the ACE 106. It will be understood that the AAF may be located on the UE 102 or on the network.

Negative assertions may refer to assertions that convey a failed authentication of an entity. Negative assertions may be used to provide such an entity with limited access or no access to a service. Negative assertions may be logged, for example, so that future requests to access a service by an entity and/or future authentication attempts by the entity may be based on the logged information. For example, logged (stored) assurance levels and freshness levels may be used to provide a user/UE with limited access following an authentication failure. A negative assertion may comprise a previous positive assertion that includes its associated assurance level values and/or freshness level values.

In the context of electronic user authentication, assurance may be defined as a degree of confidence in the user being who the user claims to be. In some implementations, the user's claim is substantiated on credential(s) that are issued to the user. Thus, a user assurance level may be based on the degree of confidence that an individual who uses the credential is the individual to whom the credential was issued. According to embodiments described herein, a measure of assurance is based on various factors that determine an "assurance level." Assurance levels may be communicated from the asserting authority to the ACE based on the authentication protocol that should be performed. Alternatively, the ACE may specify a minimum authentication assurance level that is required to access a service that an SP provides. An assurance level that is associated with an authentication may be based on various variables such as, for example, characteristics of the authentication (e.g., whether password-based authentication, biometric-based authentication, or a combination of user and/or device authentications was performed), how the authentication credentials and/or assertions are communicated, characteristics of the storage and access of the authentication credentials, characteristics of registration (e.g., how registration was conducted, whether the registration used weak/unsecure protocols or strong/secure protocols, whether registration used multiple factors of authentication, etc.), and the security posture of the entities involved in the authentication. Characteristics, which can also be referred to as authentication variables, of the authentication which may help determine an assurance level comprise, for example and without limitation, which authentication protocol was implemented (e.g., GBA_U may have a higher assurance value than GBA_ME which may have a higher assurance value than GBA_Digest), the strength of the algorithm that was used, the key length, whether the key was a shared secret key or a public key, whether the authentication provided for Perfect Forward Secrecy (PFS) and/or Perfect Backward Secrecy (PBS), the authentication factors (e.g., passwords, biometrics, or the like) used in the authentication, and whether re-authentication may compromise the authentication protocol. For example, re-authentication may compromise the authentication protocol if a strong authentication protocol was used initially, and the re-authentication protocol is less secure than the initial authentication protocol.

In an example embodiment, the manner in which authentication credentials and/or assertions are communicated affects the assurance level. Thus, the assurance level may be based on how the authentication assertion or the authentication credentials are transmitted and received. For example, the assurance level may be based on the messaging and protocols which are used for communicating the credentials and/or assertions, whether the messaging is protected for confidentiality and integrity, the layers of protection of the communications (e.g., application layer and other lower layer protections), the level of security protection for any negotiation and key generation processes, whether the communication protocol is secure against man-in-the-middle (MITM) attacks, or the like.

In an example embodiment, the assurance level depends on the manner in which authentication credentials are stored and accessed. Thus, the assurance level may be based on characteristics of the storage and access of authentication credentials. For example, the assurance level may be at least partially determined by whether authentication credentials are stored in a dedicated hardware, whether access to the credentials requires authorized processes (e.g., what standards are used to access credentials), whether the share secret or private key is stored in a secure area, whether a compromised device (e.g., UE) may access and/or expose a shared secret or private key, or the like. In an example embodiment in which the credentials are stored in a dedicated hardware, the assurance level is based on the smart card standards in which the dedicated hardware adheres.

An association between the various forms (implementations) of authentications and assurance levels may be stored on the user device (e.g., match-on-device) or on the AAF on a server (e.g., match-on-server). Assurance levels may be communicated as a quantitative value or a qualitative value. Such values may combine the aforementioned authentication variables in a weighted fashion. In an example embodiment, the highest level of assurance (e.g., strongest authentication) may be achieved by combining the strongest forms of "who a user is," "what a user has," and "what a user knows" as various factors of orthogonal authentications. For example, when a user and a phone are authenticated using a strong high entropy password, a UICC in the phone that the user possesses, and a biometric factor, the weight (e.g., strength) of each of the aforementioned authentication factors may be high, which results in a high assurance level. For example, the weight of each of the authentication factors may be equal to each other. By way of another example, if the user's password is somewhat weak, then the weight of the password authentication may reduce the overall assurance level. By way of yet another example, adding factors of time corresponding to an attempted access to a service (freshness) and the location from where the access is being attempted may result in a higher degree of confidence and may increase the overall assurance level.

In an example embodiment, the overall assurance level is determined by the lowest assurance level achieved by the various authentication factors. In another example embodiment, if the assurance level is below a predetermined threshold, then limited access is provided to the user and/or device. In an authentication using biometrics, for example, the type of biometrics used and/or the associated template data, environmental factors, and/or errors in the sensor devices may impact the assurance level of the authentication. In an example embodiment in which a new authentication is not possible, existing or previous security association characteristics may be used to derive a new authentication assertion or keying material. Such keying material may have limited capabilities.

Authentication freshness levels may include and convey a timestamp according to an example embodiment. For example, the timestamp may be used to infer the age of the security association. Alternatively, the age of the security association may be conveyed directly from the AAF to the ACE. Freshness Levels may be stored on the user device (e.g., match-on-device implementation) or on the AAF on a server (e.g., match-on-server implementation). For example, assurance levels and freshness levels may be stored (e.g., by an ACE, server, AAF, UE, or the like) for a period of time to establish an authentication history. In an example embodiment, the stored levels may expire, at which time a re-authentication may take place. For example, a user/UE may be re-authenticated to a new freshness level. The stored assurance and freshness levels may be re-used, for example, in the event of an authentication failure to provide a user and/or UE with limited access or no access to a service. Limited access may refer to any access that is less than limitless or a full access to a service. For example, limited access to a service may be granted because the service provider is aware (e.g., via the stored information) that authentication succeeded at some point in the past. By way of example, if a service provider is a banking website, limited access may mean that the user is able to view an account without making transactions. Thus, in the aforementioned banking example, a limitless or full access may mean that user is able to view the account and make transactions. Limited access may refer to various levels of access that may depend on the service that is being provided. For example, the service access may be risk based such that a low assurance level would allow access to low risk services. In the banking example, a low risk service may include an authorization for a payment of no more than ten dollars, while a high risk service may include an authorization for a payment of one thousand dollars. Thus, the service access may be graded based on a range of assurance levels, whereby full access is allowed when the highest level of assurance is achieved, while minimal services (or no services) are allowed for the lowest level of assurance achieved.

In an example embodiment, the results and/or assertions of various authentications that are conveyed to the ACE may be bound together. For example, binding of results or assertions may limit access to a service to a particular user using a particular device. The binding may be cryptographic binding, for example, so that access to the binding key is limited to the ACE and the user and/or user device. The authentications binding key (ABK) may be derived based on a key derivation function (KDF) that may take the cryptographic or non-cryptographic input or output of the authentication ($MSK\_u$) and device authentication ($MSK\_d$) as its inputs. For example, the binding key may be computed as: ABK=KDF ($MSK\_u$, $MSK\_d$, Random Data, . . . ).

Multiple authentications may be bound together. Bindings are not limited to user (knowledge-based) and device authentication bindings. For example, authentications that are based on a user's physiological characteristics (e.g., output: $MSK\_p$) and behavioral characteristics (e.g., $MSK\_b$) may be combined with the outcomes of knowledge-based and device authentications. Such an authentication binding key may be derived in the following form: ABK=KDF ($MSK\_u$, $MSK\_d$, $MSK\_p$, $MSK\_b$, . . . ). Although various bindings are described herein by way of example, it will be understood that other authentication results and assertions may be bound as desired.

In an example embodiment, authentication results are chained. For example, authentications may be chained when a network entity is capable of performing the U_AAF and the D_AAF. For example, a user master session key (MSK_u) and a device master session key (MSK_d) may be derived at the same entity and conveyed to the ACE at the end of the chained authentication on the network side. Such chaining may use an extensible authentication protocol (EAP) chained process, for example, wherein EAP-TTLS may be used with EAP-AKA or GBA with GBA SIP Digest or a combination of authentication processes.

Figure 3A:
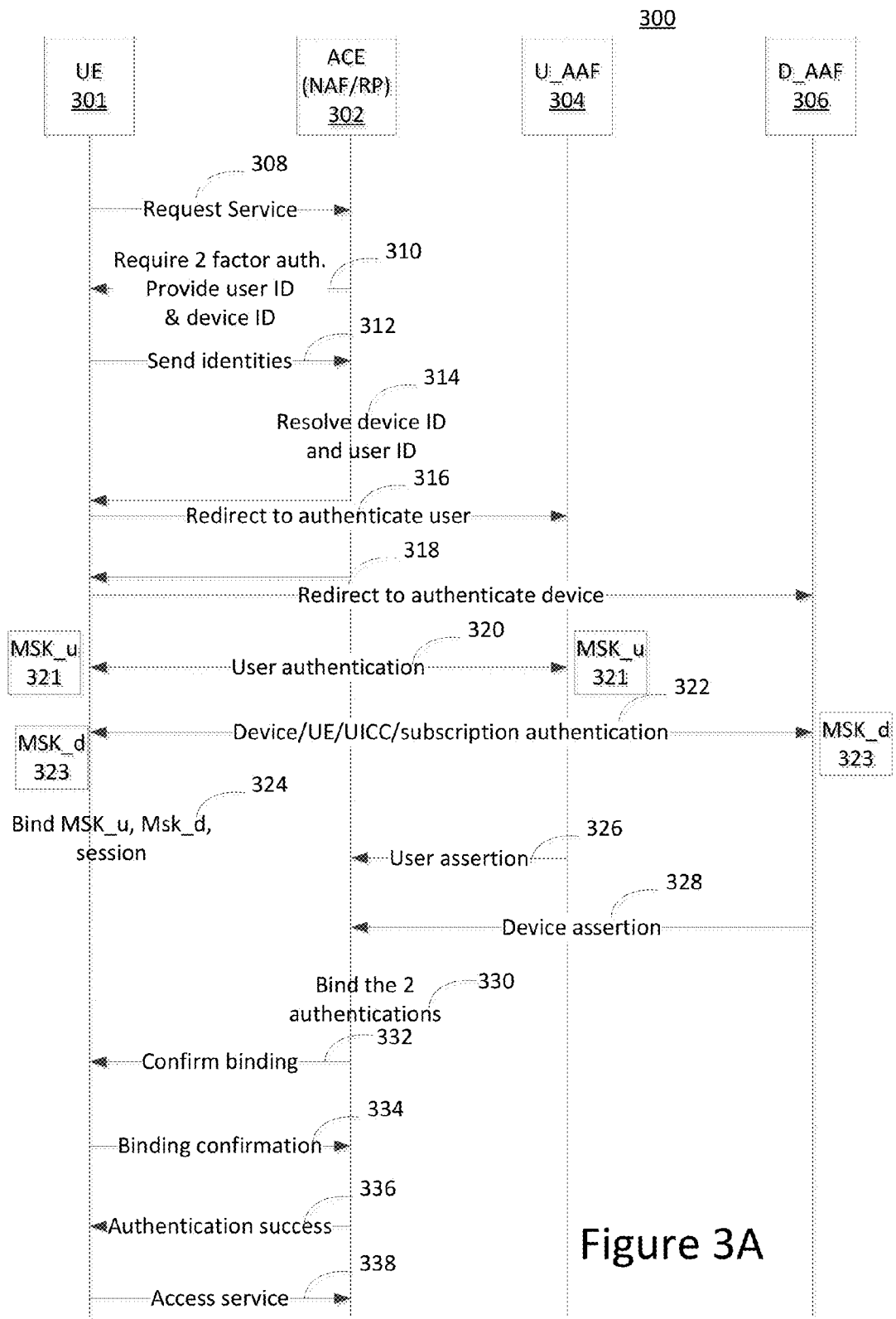
FIG. 3A is a flow diagram for accessing a service that may require user and device authentication according to an example embodiment.
Figure 3B:
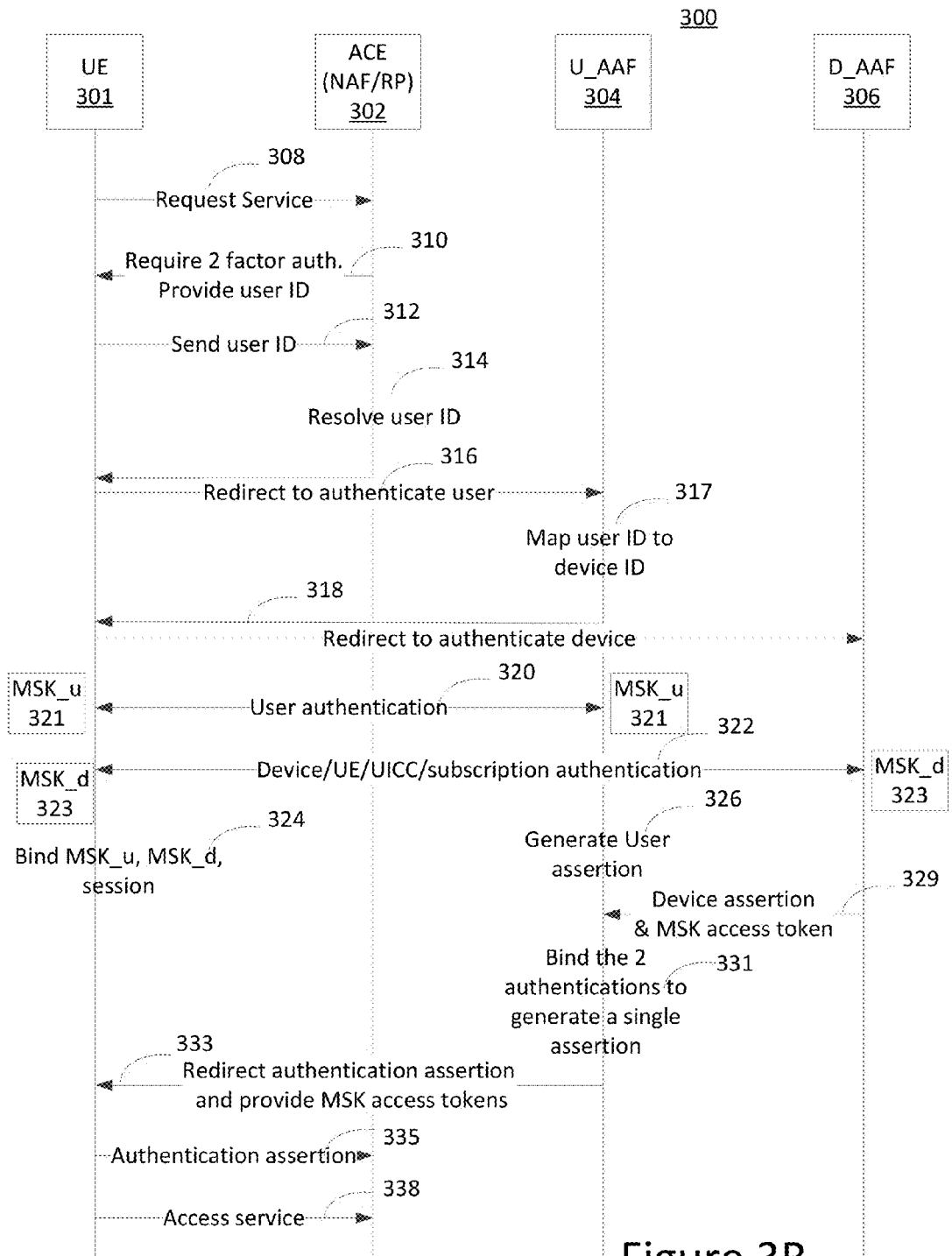
FIG. 3B is another flow diagram for accessing a service that may require user and device authentication according to another example embodiment.

FIGS. 3A and 3B are flow diagrams for accessing a service that may require user and device authentication according to example embodiments. In the example call flows shown in FIGS. 3A and 3B, a user wishes to access a service that requires at least a two-factor authentication (e.g., username with password/PIN and Device/UICC based authentication).

Referring to the illustrated embodiment shown in FIGS. 3A and 3B, a system 300 includes a UE 301, an ACE 302, an U_AAF 304, and a D_AAF 306 which communicate with each other via a network. The UE 301 has a user who operates the UE 301. Thus, the UE 301 may be referred to as a user/UE 301 to denote that the UE has a user. At 308, the user, via the UE 301, requests access to a service that is controlled by the ACE 302. It will be understood that the ACE 302 may be referred to as a Network Application Function (NAF) as defined in 3GPP GBA, a Service Provider, a Relying Party (RP)/Client as defined in OpenID/Open ID Connect protocols, or any other entity that may perform an access control function. The request at 308 may be communicated over an HTTP connection, or other connections as desired.

At 310, the ACE 302, based on the type of service request and based on the policies governing the service, requests the UE/user 301 to provide its user or subscription identity and its device or device subscription identity. The user identity may be tied to an application or service to which the user subscribes and the user may be required to enter user credentials. The device identity may be tied to the device (e.g., the UE 301, UICC) that is being used to access the service. Further, at 310, the UE 301 may obtain a measure of a strength of a user authentication and/or a measure of a strength of a device authentication. Thus, a user or device authentication may be based on the obtained measures of strength.

At 312, the user and device identities are provided. For example, the user identity may be a local identity or a third-party identity (e.g., SSO identity) of the user. An example of such an identity is xyz@gmail.com. The subscription identity may be tied to a device/UICC/smartcard (e.g., UE 301) and may be represented by means of a shared secret or a certificate. An example of such an identity may be IMSI@att.com. In accordance with the illustrated embodiment, both the identities are sent by the UE 301 to the ACE 302. At 314, the identities of the user/UE 301 are received and the ACE 302 resolves the identities, for example, to discover the User Authenticator and Assertion Function (U_AAF) 304 and the Device Authenticator and Assertion Function (D_AAF) 306. At 316, the ACE 302 redirects the UE 301 to the U_AAF 304, for example, so that the UE 301 is able to initiate user authentication with the U_AAF 304. Similarly, at 318, the ACE 302 redirects the UE 301 to initiate device authentication with the D_AAF 306.

In accordance with the illustrated embodiments shown in FIGS. 3A and 3B, at 320, user authentication is performed, for example, by using a mutual authentication protocol (e.g., EAP-TTLS, EAP-TLS, GBA SIP Digest, or the like) and by using client authentication mechanisms (e.g., Open Id username/password). At the end of the user authentication, a shared user Master Session Key (MSK_u) 321 is derived that may be bound to the user and the U_AAF 304. In an example embodiment, step 320 is skipped if a valid authentication association exists between the user and U_AAF 304. A valid authentication association may be determined by the AAF if the age or freshness of a prior authentication that was carried out between the user and the U_AAF 304 meets the required authentication freshness requested by the ACE 302. At 322, device authentication is carried out between the UE 301 and the D_AAF 306. In particular, the device authentication may be carried out between an UICC that resides on the UE 301 and the D_AAF 306. The authentication of the UE 301 (device authentication) may be performed by using a mutual authentication protocol (e.g., GBA, EAP-SIM/AKA etc.) and/or by using device authentication based on a device certificate. At the end of the device authentication, a shared key may be derived (e.g., MSK_d 323) that may be bound to the UE/UICC entity and the D_AAF entity. In an example embodiment, step 323 is skipped if a valid authentication association exists between the UE 301 (e.g., UICC) and the D_AAF 306. A valid authentication association may be determined by the AAF if the age or freshness of a prior authentication that was carried out between the UE 301 and the D_AAF 306 meets the required authentication freshness requested by the ACE 302.

At 324, in accordance with the illustrated embodiment, the UE 301 binds the MSK_u 321 and the MSK_d 323 to the session and an Authentications Binding Key (ABK) is derived. The ABK may be derived using a Key Derivation Function (KDF) that is applied to, for example, the MSK_u 321, the MSK_d 323, the session information, and random data. The ABK may bind the channel or channel parameters and the authentication mechanisms together. Channel parameters may be values such as the TLS master Key or other values that are determined to be unique to each channel that was established between the AAF and the UE/user 301.

At 326, once the user is authenticated, for example, the U_AAF 304 generates an assertion based on the measure of user authentication strength, for example, that was obtained at 310. The assertion may be referred to as a user assertion because it is associated with the user. The user assertion indicates a result of the authentication (from 320) between the user and the U_AAF 304. The user assertion may be a positive assertion if the user is successfully authenticated at 320. For example, the assertion may comprise the results of a plurality of user authentication factors (e.g., from multi-factor user authentication performed at 320). Further, as shown in FIG. 3A, the user assertion may be provided to the ACE 302. The user assertion may include the user identity and a user authentication assurance level that corresponds to the user authentication. The user assertion may further include an indication of the freshness of the user authentication. The indication of the freshness of the user authentication may be referred to as a freshness level of the security association between the user and the U_AAF 304. The MSK_u 321 may be transported using the assertion message at 326 or a token may be sent in the assertion message at 326. For example, the token may be used to retrieve the MSK_u 321.

Referring to FIGS. 3A and 3B, at 328 and 329, respectively, once the UE 301 is authenticated, for example, the D_AAF 306 generates an assertion based on the measure of device authentication strength obtained at 310. The assertion may be referred to as a device assertion because it is associated with the UE 301. The device assertion indicates a result of the authentication (from 322) between the UE 301 and the D_AAF 306. The device assertion may be a positive assertion if the UE 301 is successfully authenticated at 322. For example, the assertion may include a plurality of device authentication factors (e.g., from multi-factor device authentication performed at 322. Further at 328 (FIG. 3A), the device assertion is provided to the ACE 302. Alternatively, at 327 (FIG. 3B), the device assertion is provided to the U_AAF 304, and the device assertion is sent with a master session key (MSK) access token. The device assertion may include the device identity and a device authentication assurance level that corresponds to the device authentication. The device assertion may further include an indication of the freshness of the device authentication. The indication of the freshness of the device authentication may be referred to as a freshness level of the security association between the UE 301 and the D_AAF 306. The MSK_d 323 may be transported using the assertion message at 328 or a token may sent in the assertion message at 328. For example, the token may be used to retrieve the MSK_d 323.

With reference to FIG. 3A, in accordance with the illustrated embodiment, at 330, the user assertion is bound to the device assertion to create a bounded assertion at the ACE 302. Alternatively, referring to FIG. 3B, in accordance with the illustrated embodiment, at 331, the user assertion (user authentication result) is bound to the device assertion (device authentication result) at the U_AAF 304. It will be understood that the assertions may be combined at various entities that can match the authenticated user identity (e.g., username or the like) to the identity of the UE 301 (e.g., IMSI). Thus, the D_AAF 306 may also combine the assertions. Further, because the AAF may reside on the UE 301, it will be understood that authentication assertions may be combined at the UE in accordance with an example embodiment. Further, the binding may be delegated to the UE 301 as a proxy function of a network-based AAF. Referring again to FIG. 3B, the U_AAF 304 maps the identity of the user to the identity of the device at 317. Thus, the user and device authentications may be bound at 331 to generate a single bounded assertion.

With continuing reference to FIGS. 3A and 3B, the bounded assertions may include a combined result of the user authentication assurance level and the device authentication assurance level. In an example embodiment, the assertions are bound together if positive user and device assertions are received. In another example embodiment, the device assertion is positive if the device authentication assurance level and the device authentication freshness level are within respective acceptable ranges. Such ranges may be determined by a policy of the service provider that provides the service or resource. Similarly, for example, the user assertion may be positive if the user authentication assurance level and the user authentication freshness level are within respective acceptable ranges that may be determined by a policy of the service provider that provides the service. Thus, if the assurance and freshness levels of the security associations are within an acceptable range, then the assertions may be bound together with the session. Referring to FIG. 3A, the same key derivation may be carried out at the ACE 302 to derive the ABK. For example, knowledge of the ABK may be limited to the ACE 302 and the UE 301. Referring to FIG. 3B, at 333, the U_AAF 304 provides the ACE 302 with MSK access tokens via a re-direct message, which may include the assurance levels and freshness levels associated with the bounded assertion, and redirects the UE 301 (e.g., via browser re-direct) to assert the bounded authentication assertion to the ACE 302. At 335 (FIG. 3B), the UE 301 is re-directed that asserts the authentication assertion (result) to the ACE 302.

Referring to FIG. 3A, in accordance with the illustrated embodiment, the ACE 302 queries the UE 301 at 332 to confirm the binding from 330. At 334, the UE 301 confirms the binding. The confirmation may be a cryptographic response, for example, that may be used to infer possession of the ABK, or the ABK may be sent to the ACE 302 as a password (e.g., using mechanisms similar to HTTP Digest). After obtaining the binding confirmation from the UE 301, the ACE may verify the ABK it derived. In an example embodiment, upon a successful verification of the binding, the UE 301 is authenticated and an Authentication Success message is sent to the UE, at 336. The ABK may be used as the Master Key in order to derive Session Keys used to access the service. Referring to FIGS. 3A and 3B, the UE 301 may access the service or resource, at 338. Thus, the UE 301 may receive access to a service or resource based on the assertion at 330 (FIG. 3A) or 331 (FIG. 3B), and in particular based on the user assertion and the device assertion. Such access may be referred to as a full access or limitless access.

In another example embodiment, the user assertion (e.g., at 326) comprises a negative user assertion that indicates that the result of the authentication (e.g., at 320) between the user and the U_AAF 304 is negative. In response to such a negative user assertion, the user/UE 301 may receive a limited access or no access to the service. Similarly, the device assertion (e.g., at 328 or 327) may comprise a negative device assertion that indicates that the result of the authentication (e.g., at 322) between the UE 301 and the D_AAF 306 is negative. In response to such a negative device assertion, the user/UE may receive a limited access or no access to the service. Further, the bounded assertion (e.g., at 330 or 331) may comprise a negative bounded assertion that indicates that at least one of the results of the authentication between the user and the U_AAF 304 or the authentication between the UE 301 and the D_AAF 306 is negative. In response to the negative bounded assertion, the user/UE 301 may receive a limited access or no access to the service. Thus, if at least one of the device authentication assurance level, the device authentication freshness level, the user authentication assurance level, or the user authentication freshness level are not within a respective acceptable range, the user/UE 301 receives a limited access or no access to the service. In accordance with yet another embodiment, if at least one of the device authentication assurance level and the device authentication freshness level are not with a respective acceptable range, the UE 301 is re-authenticated with the D_AAF 306. Similarly, if at least one of the user authentication assurance level and the user authentication freshness level are not with within a respective acceptable range, the user may be re-authenticated with the U_AAF 304.

In an example embodiment, a strong assurance level of authentication includes authentication of the subscription of a device and authenticates the user to that particular service subscription. For example, in one embodiment, the user is authenticated to the device using a user pin/password, biometrics, or the like, and the results of the user authentication are stored on an UICC of the device and communicated to the network. To make the authentication seamless, for example, the user may not have to be authenticated for each service access request. The user may be authenticated periodically, and an associated freshness level and assurance level may be used to indicate when a previous authentication was performed and the type of authentication that was performed.

Services may have different requirements for freshness and assurance levels. Such requirements may be based on policies of the service provider that provides the service. For example, a user authentication may have to be performed again, for example if a service provider demands that the freshness level or assurance level or both are not satisfactory. A level may be unsatisfactory if it does not meet the service's criteria for user authentication.

Figure 4:
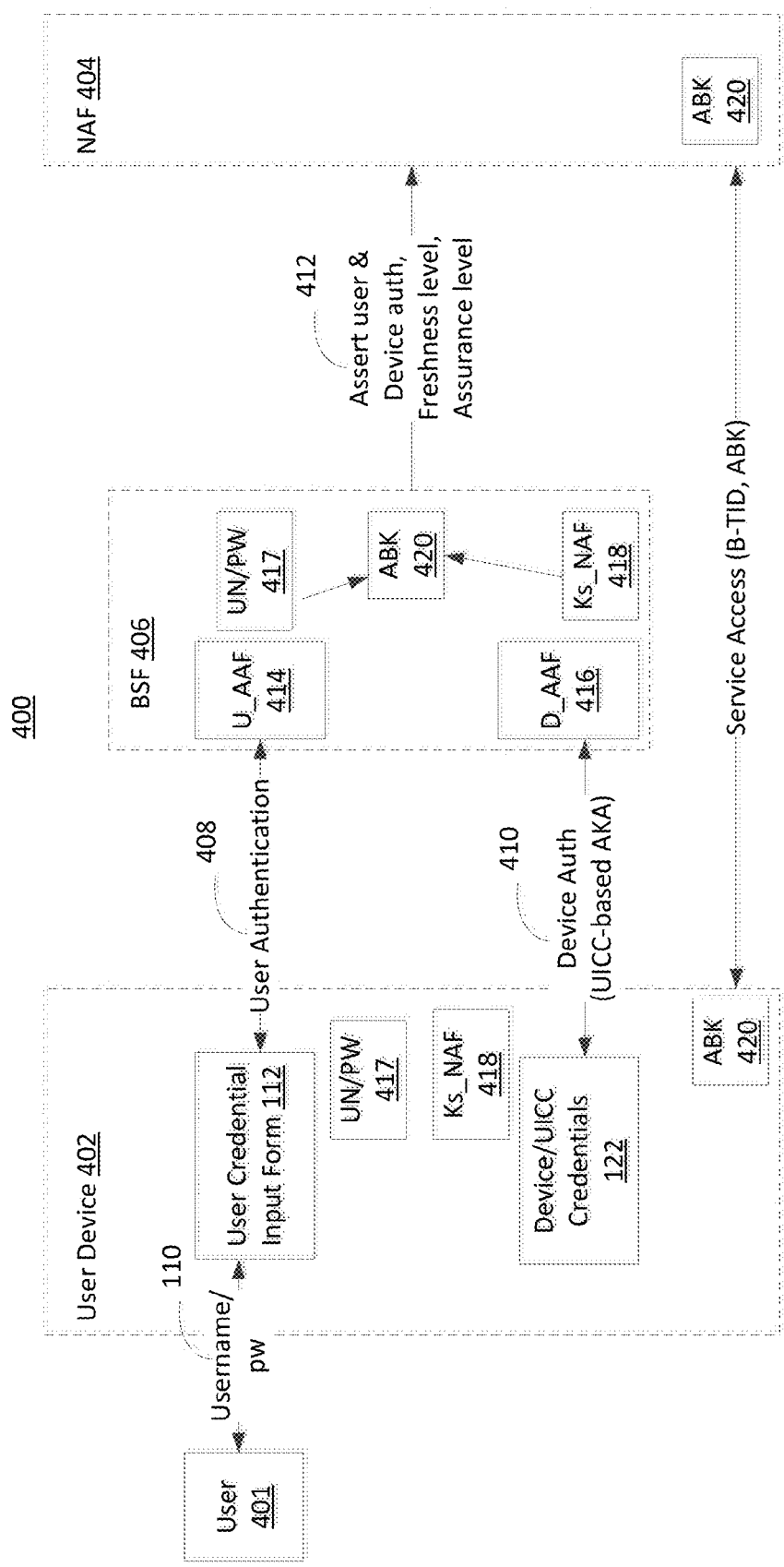
FIG. 4 is a block diagram of a system that implements a match-on-server implementation with a Generic Bootstrapping Architecture (GBA) authentication and assertion according to an example embodiment.

FIG. 4 is a block diagram of a system 400 that implements a match-on-server implementation with Generic Bootstrapping Architecture (GBA) authentication and assertion according to an example embodiment. The system 400 includes a user device 402 (e.g., WTRU), a bootstrapping server function (BSF) 406, and a NAF 404 which communicate via a network. The illustrated GBA mechanism may be used for authentication and for bootstrapping the UE 402 to a NAF 406. Referring to the illustrated embodiment shown in FIG. 4, the BSF 406 binds the user Authentication from 408 and device authentication from 410 to provide a bounded assertion to the NAF 404, at 412. In accordance with the illustrated embodiment, the BSF 406 includes an U_AAF 414 and an D_AAF 416. An assurance level that is associated with the bounded assertion may be provided at 412. Further, a freshness level that is associated with the bounded assertion may be provided at 412. User credentials (e.g., Username/Password) may be bound to a Ks_NAF 418, which may be derived as part of a UICC-based AKA device authentication that may occur at 410. Referring also to FIG. 1, the BSF 406 may function as an AAF, and the NAF 404 may function as the ACE 106. An ABK 420 may be derived by cryptographically incorporating (binding) the user credentials (e.g., username (UN)/password (PW) 417) with the Ks_NAF 418 to form the ABK 420. Alternatively, the NAF 404 may function as an AAF that creates a combined assertion for both the user and device authentication and sends the assertion with the corresponding assurance and freshness levels to an ACE (e.g., the ACE 106 shown in FIG. 1 which may be implemented by a Relying Party (RP) or Service Provider (SP)), and the BSF 406 may function as the U_AAF 414 or D_AAF 416 or both (as illustrated in FIG. 4).

As described herein, multi-factor authentication may employ user and mobile subscriber credentials (e.g., stored in a UICC). The Generic Authentication Architecture (GAA) of 3GPP provides the framework for various embodiments. In an example configuration, a UE includes a smartcard (UICC/SIM), a mobile environment (ME) (e.g., a GBA enabled browser), and a client module for communicating with bootstrapping entities on the operator's network. The UICC may provide storage for subscriber and user level credentials such as a strong secret that the UE shares with the network (e.g., subscriber credentials) and user credentials (e.g., in the form of username and password).

Figure 5:
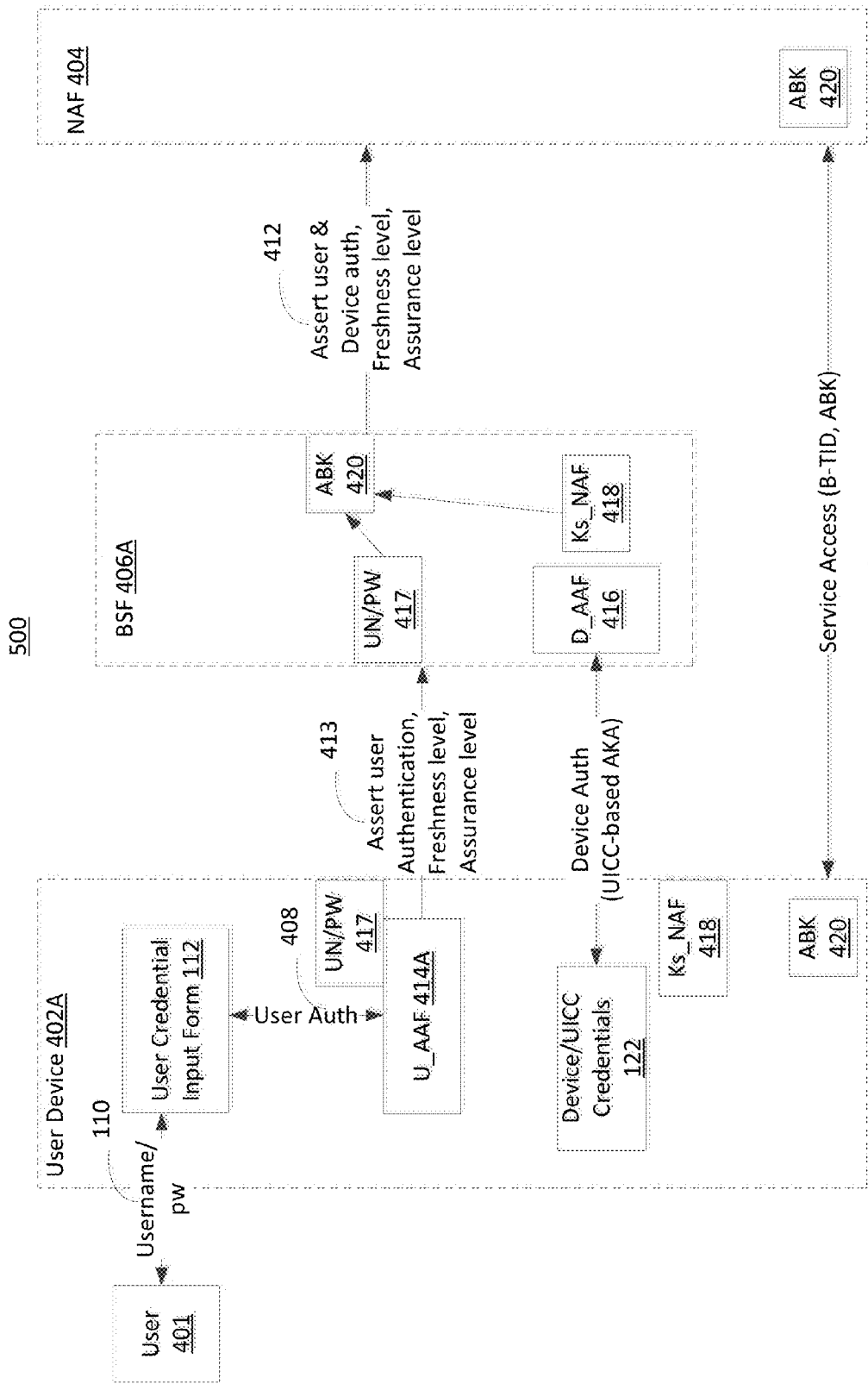
FIG. 5 is a block diagram of a system that implements a match-on-device implementation with illustrating the GBA authentication and assertion shown in FIG. 4 according to another example embodiment.

FIG. 5 is a block diagram of a system 500 that implements a match-on-device implementation with the GBA authentication and assertion shown in FIG. 4 according to another example embodiment. In accordance with the illustrated embodiment shown in FIG. 4, user authentication and assertion is carried out on the user device 402A, and the BSF 406 performs the D_AAF 416 based on UICC-based AKA. The U_AAF 414A on the user device 402A may assert the authentication of the user to the BSF 406 at 413. The BSF 406 may bind the result of the user authentication with the Ks_NAF 418 that is derived as part of the device authentication at 410.

With respect to GBA implementations, such as the GBA implementations referenced in FIGS. 4 and 5, the NAF 404 may comprise the ACE. The user authenticator and assertion function (U_AAF) 414 may comprise the user device 402 without network involvement (e.g., Match-on-Device). The BSF 406 may function as the AAF when the network is involved (e.g., Match-on-Server). The device authenticator and assertion function (D_AAF) 416 may be comprised by the BSF 406. The Master Session Key that is derived via device authentication (MSK_d) may be denoted Ks, which may be derived by concatenating the confidentiality key (CK) and the integrity key (IK). CK and IK may be part of the authentication vector (AV) obtained from the HSS in the network and may be derived in the UE 402 as part of the bootstrapping process during GBA. The Master Session Key that may be derived via user authentication (MSK_u) may not exist if "normal" GBA is run. If GBA_Digest is run, Ks may be derived as per the formula shown in TR 33.804, section 7.2.2, step 6: Ks=KDF (H(A1), "GBA_Digest_Ks", TLS_MK_Extr, RESP), where H(A1) is the hash of the user name and password used by the user in IMS for SIP Digest according to TS 33.203, Annex N, and the realm shown in RFC 2617; RESP is the authentication response from the UE to the BSF; TLS_MK_Extr is extracted from the TLS master key according to RFC5705; and "GBA_Digest_Ks" is a character string. In this case, where SIP digest credentials are used, Ks may be a user authentication key MSK_u. A binding key may be employed as described herein, for example, where network-assisted user authentication is combined with GBA. 3GPP TR 33.804: "Single Sign On (SO) application security for Common IP Multimedia Subsystem (IMS) based Session Initiation Protocol (SIP) Digest" is incorporated by reference as if set forth in its entirety herein. Alternatively, the BSF 406 may function as the D_AAF 416 or the U_AAF 414 or both, while the NAF functions as an AAF and thus creates a combined assertion for both the user and device authentication results that are received from the U_AAF 414 and the D_AAF 416, respectively. The combined assertion and freshness and assurance levels that are associated with the combined assertion, are then sent to the ACE. It will be understood that the ACE may be an SP or an RP.

Figure 6:
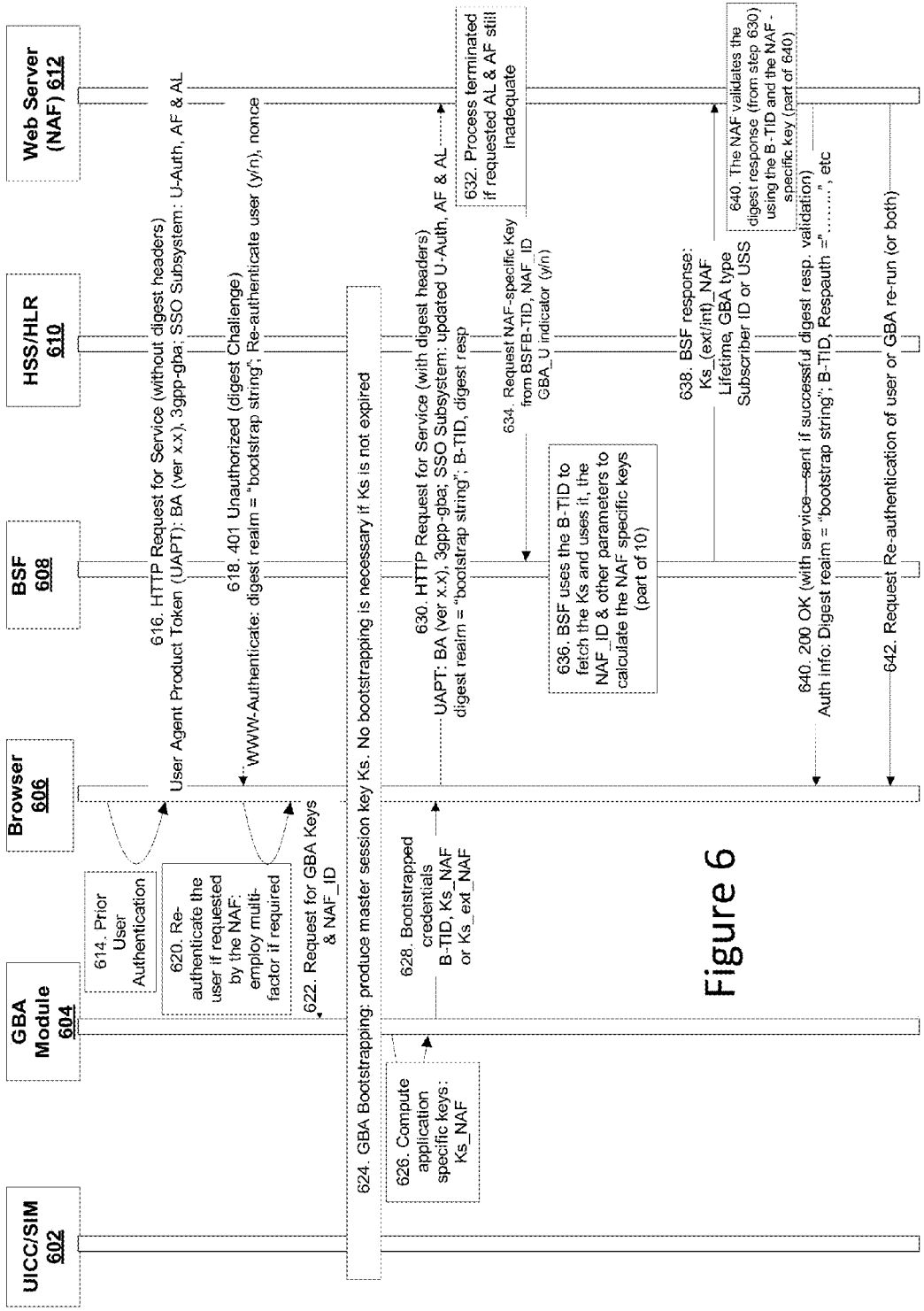
FIG. 6 is a flow diagram illustrating a combination of a GBA and a local user authentication according to an example embodiment.

FIG. 6 is a flow diagram for user access to a service that illustrates a combination of a GBA and a local user authentication according to an example embodiment. As described herein, various embodiments include modified portions of the flow diagram illustrated in FIG. 6. The described protocol flow with reference to FIG. 6 may provide flexibility within the constraints of the policies of the MNO and NAF.

Referring to FIG. 6, a system 600 includes a UICC/SIM 602, a GBA module 604, a browser 606, a HSS/HLR 608, and a web server (e.g., NAF) 610 which communicate via a network. The UICC/SIM 602, GBA module 604, and the browser 606 may reside in a user device which may be referred to herein as an UE or WTRU without limitation.

In accordance with the illustrated embodiment, at 616, an HTTP request for service message is to the NAF Web server 612. The message may be sent without digest headers, for example, if using HTTP. The UE web browser 606 may be assumed to know the identity (ID) of the NAF 612 which may comprise its FQDN. In the request, the browser 606 may add "product" tokens in the "User Agent" header field. For example, a product token may indicate that it is GBA capable (e.g., denoted 3gpp-gba) and a product token may indicate that it possesses an SSO Subsystem. The SSO Subsystem may refer to a network proxy on the UE which performs, among various other functions, user authentication. The SSO subsystem may provide evidence that the user was actively authenticated (e.g. at 614) and may provide information regarding the assurance level (AL) and the associated authentication freshness (AF). The AF may be referred to herein as the freshness level without limitation. Following the initial request for service by the UE via the browser 606, the NAF 612 may indicate whether the user is required to be re-authenticated. Such a decision may be based on the AL and AF which was provided by the UE in the initial request at 616. For example, GBA may be performed and user authentication (e.g., re-authentication, if requested) may be performed locally on the user device.

At 618, the NAF 612 may notice that the URL in the request identifies the service which may require authentication. For example, the NAF 612 may inspect the User-Agent header and may determine the GBA capabilities of the UE. The NAF 612 may send a response (e.g., 401 unauthorized "digest challenge") to the UE. Such a response may indicate that authentication is required. Within that response the NAF 612 may add a realm value, for example, with the format '3gpp-bootstrapping@www.naf.org'. The prefix value '3gpp-bootstrapping@' may indicate that bootstrapping is to be performed with GBA as the required protocol. In an example embodiment, the NAF 612 inspects the user authentication assurance level and freshness level to determine their adequacy. If it is determined that the levels are not adequate, for example the levels are not within respective acceptable ranges or the levels are below respective acceptable thresholds, a user re-authentication may be requested. In an example embodiment, the NAF 612 indicates what authentication levels are acceptable.

In accordance with the illustrated embodiment, at 620, the user is re-authenticated, for example, if re-authentication is requested by the NAF 612. Re-authentication may employ user-based credentials, such as username and password for example, which the user may be actively required to enter. In an example embodiment in which multi-factor user authentication is requested, a biometric may also be used. The UE may decide to terminate the request for service, for example, if it decides that it will not meet the lowest assurance level indicated by the NAF. Alternatively, the UE may request limited service (access) if it decides that it will not meet the lowest assurance level. For example, limited access to a service may require a lower assurance level than limitless (full) access. Thus, limited access may be negotiated with the NAF 612. Although not shown in FIG. 6, it will be understood that user credentials that are entered may be verified with corresponding information on the UICC.

At 622, the browser 606 sends a request, which may comprise the identity of the NAF 612 (NAF_ID), to the GBA module 604 for the bootstrapped NAF specific key(s). At 624, the Bootstrapping to derive the master session key Ks is performed, for example, using UICC-based subscriber credentials. The entities involved in this process may include the GBA module 604 and the UICC 602 in the UE, and the BSF 608 and the HSS 610 in the MNO domain. For example, the GBA module 604 may check to determine whether the application requesting the bootstrapping (and thereby receiving the application specific key derived from it using a particular NAF_ID) is authorized to do so.

In accordance with the illustrated embodiment, at 624, the GBA module 604 derived the NAF-specific key (Ks_NAF) and delivers it to the browser 606. Delivery of the key may comprise various information such as, for example, the B-TID, the key lifetime, and other information indicating the GBA-type for example. At 626, the NAF-specific key (or keys) may be derived from Ks, the NAF_ID provided by the browser 606, and other parameters such as the private identity IMPI and RAND for example. When GBA_U is performed, for example, Ks_int_NAF and Ks_Ext_NAF may be computed on the UICC 602. The Ks_Ext_NAF may be passed to the GBA module 626.

In accordance with the illustrated embodiment, the bootstrapped credentials are sent to the browser 606 at 628. At 630, after receiving the bootstrapped material from the GBA Module 604, the browser prepares the Digest response to the challenge in step 618. For example, it may use the original service request message with the calculated Digest response parameters in the 'Authorization' header. The calculation may use the B-TID as the user name and the NAF-specific key as the password. The response may be calculated according to IETF RFC 2617 (1999): "HTTP Authentication: Basic and Digest Access Authentication", which may be referred to herein as RFC 2617 and is incorporated by reference as if its contest are set forth in its entirety herein. Thus, response may include the updated user authentication result, the assurance level corresponding to the user authentication, and the authentication freshness corresponding to the user authentication, for example, if user re-authentication was requested by the NAF 612.

At 632, the NAF 612 checks the updated assurance level and freshness level. For example, the NAF may terminate the protocol if either level or both levels are determined to be inadequate. The assurance levels or the freshness level may be inadequate if they are outside respective acceptable ranges or below respective thresholds. At 634, if the protocol is not terminated at step 632, for example, the NAF 612 may send the B-TID (e.g., received in step 630) and its NAF_ID to the BSF 608 to request the NAF-specific key. The NAF 612 may request the user security settings (USS) with the GAA service identifier and/or may indicate that it is GBA aware. At 636, the BSF 608 uses the B-TID to fetch the Ks and uses it, the NAF_ID, and other parameters to calculate the NAF specific keys.

In accordance with the illustrated embodiment, at 638, the BSF 608 checks to verify that the NAF 612 is authorized to receive the NAF-specific key that it is requesting. If the NAF 612 is authorized, the BSF 608 may locate the master session key Ks which may be identified by the B-TID and may proceed (e.g., as in step 624) to calculate the NAF-specific key(s). USS may comprise key usage requirements, for example, as specified by operator policy. This may cause process termination if the NAF 612 or the UE is unable to meet the requirement. For example, such a requirement may stipulate that Ks_int_NAF is used. In an example lacking such a requirement, the Ks_NAF or Ks_ext_NAF may be used.

At 640, the NAF 612 validates the Digest response sent by the browser 606 at 630 (e.g., using the NAF-specific key received from the BSF 608). For example, upon successful authentication of the user, the NAF 612 may send the browser the 200 OK which may indicate authentication success and authorization for the user to access the service. The message may comprise authentication information such as, for example, the B-TID and the digest realm. At 642, the NAF 612 may request a new bootstrap, for example, in the event of a NAF-specific key lifetime expiration. In an example embodiment, as time expires a user proof of presence is required, and the NAF 612 requests a user re-authentication in order to provide the proof of presence.

In one example embodiment, the example protocol flow illustrated in FIG. 6 may use an NAF Policy that may be local to the UE. For example, various NAF policies may be available on the UE. Such policies may be categorized via URL. For example, an SSO Subsystem on the UE may use the URL of the NAF to which the service request message is sent to locate the local version of the NAF's authentication policy. Such a policy lookup may be performed before the service request is made. For example, based on the policy's stated requirements, the UE SSO Subsystem may determine whether or not to locally authenticate the user initially and/or may determine what authentication strength should be employed. Thus, the UE may obtain a measure of an authentication assurance level. In an example embodiment, the UE may re-authenticate the user before sending the request for service message shown in message 616 of FIG. 6. In the event that the SSO subsystem and the NAF determine that the UE will not meet assurance level requirements, the UE may send a request for limited service based on the highest assurance that the UE may provide. The NAF may allow such limited service or may reject access to the service entirely.

In another example embodiment, the UE may provide an immediate response to the NAF request for user re-authentication. For example, the UE may send, to the NAF 612, the re-authentication information immediately following step 620 in FIG. 6. In such an embodiment, the NAF 612 may respond with another 401 Unauthorized digest challenge to the UE that may require bootstrapping (e.g., step 618). The response may indicate that the updated user authentication assurance level and/or freshness level is acceptable. For example, it may be assumed that the UE knows what authentication strength is expected by the NAF and the UE may be able to provide the expected authentication strength. If the UE is not able to provide the expected authentication strength, the UE may terminate the access request or may negotiate for limited access to the service.

As an alternative to local user authentication, the user may initially log into the NAF directly according to an example embodiment. For example, the user may enter login information to the NAF and may bypass the local SSO Subsystem that resides on the UE. For example, if the NAF login credentials are sufficient, the user may gain access to the service. In an example embodiment, it may be assumed that the user has previously registered login credentials with the NAF. In an alternative to granting access, the NAF may respond with the 401 Unauthorized digest challenge as per step 618 in FIG. 6 and may insist that bootstrapping using GBA be performed. The user, in such an example, may not gain access to the service until the NAF validates the Ks_NAF in the digest response (e.g., steps 638 and 640 FIG. 6).

In another example embodiment, GBA authentication is combined with local user login credentials in a split terminal scenario. For example, a browsing agent may be resident in a desktop computer which may gain access to the network over the air via a mobile device. A mobile device (e.g., WTRU, UE, etc.) may be physically separate from the computer. For example, the entities may communicate over a local link (e.g., established with a USB cable or Bluetooth connection). Such a link may be made secure by establishing a shared secret key (e.g., Ks_local_device) between the desktop and mobile device (e.g., as outlined in 3GPP TS 33.259: "Key Establishment between a UICC hosting device and a remote device", which is incorporated by reference as if set forth in its entirety herein). Without such a secure link, this configuration may be subject to a man-in-the-middle (MitM) attack. In this protocol embodiment, the user may log into the NAF directly. The NAF may have originally registered the user from a desktop (e.g., directly over an internet connection). In a split-terminal configuration, the NAF, communicating with the browser via the mobile device, may not see the cookie from the registration and/or may now require stronger authentication, for example, even though a "preliminary" authentication via the user-entered credentials has taken place. Example split-terminal scenarios are further described in 3GPP TR 33.924: "Identity management and 3GPP security interworking; Identity management and Generic Authentication Architecture (GAA) interworking", which is incorporated by reference as if set forth in its entirety herein.

According to another split-terminal example embodiment, the NAF may generate a session ID that it sends to the browser. The session ID may be sent following the initial HTTP request for service in which the login took place. For example, the session ID may serve to integrate the session (e.g., separate entities may be involved in the authentication by the time access to the requested service is granted). The session ID may be known to both the desktop and the mobile device, for example, because it may be transferred across the local link from the browser to the mobile (e.g., the GBA client.) The NAF may indicate that bootstrapping is required (e.g., use GBA). The mobile device may perform GBA authentication with the mobile network, the result of which may comprise the bootstrapped application specific key Ks_NAF. GBA may be performed, as the BSF/HSS entities may see the mobile device without seeing the desktop. When the browser provides its digest response to the NAF, for example, it may comprise the session ID and the B-TID. The session ID may have the effect of tying GBA (e.g., which may authenticate the mobile device), to the original session established between the browser and the NAF. For example, once it retrieves the Ks_NAF from the network, the NAF may authenticate the browser.

In yet another example embodiment, the session ID may be involved in the GBA process. For example, the initial login may weakly authenticate the user and the subsequent digest response may more strongly authenticate the browser (e.g., the entity responsible for providing the B-TID and Ks_NAF/digest to the NAF). Thus, for example, the BSF may receive the session ID from the mobile device (e.g., GBA module) when the request is made to bootstrap. The NAF may use the session ID, the B-TID, and NAF ID when requesting the Ks_NAF from the BSF. For example, the mobile device, which was involved in the GBA process according to an example scenario, may be tied to the session established between the NAF and browser. The digest authentication in such an embodiment may authenticate the entire split-terminal instead of authenticating only the browser.

Figure 7:
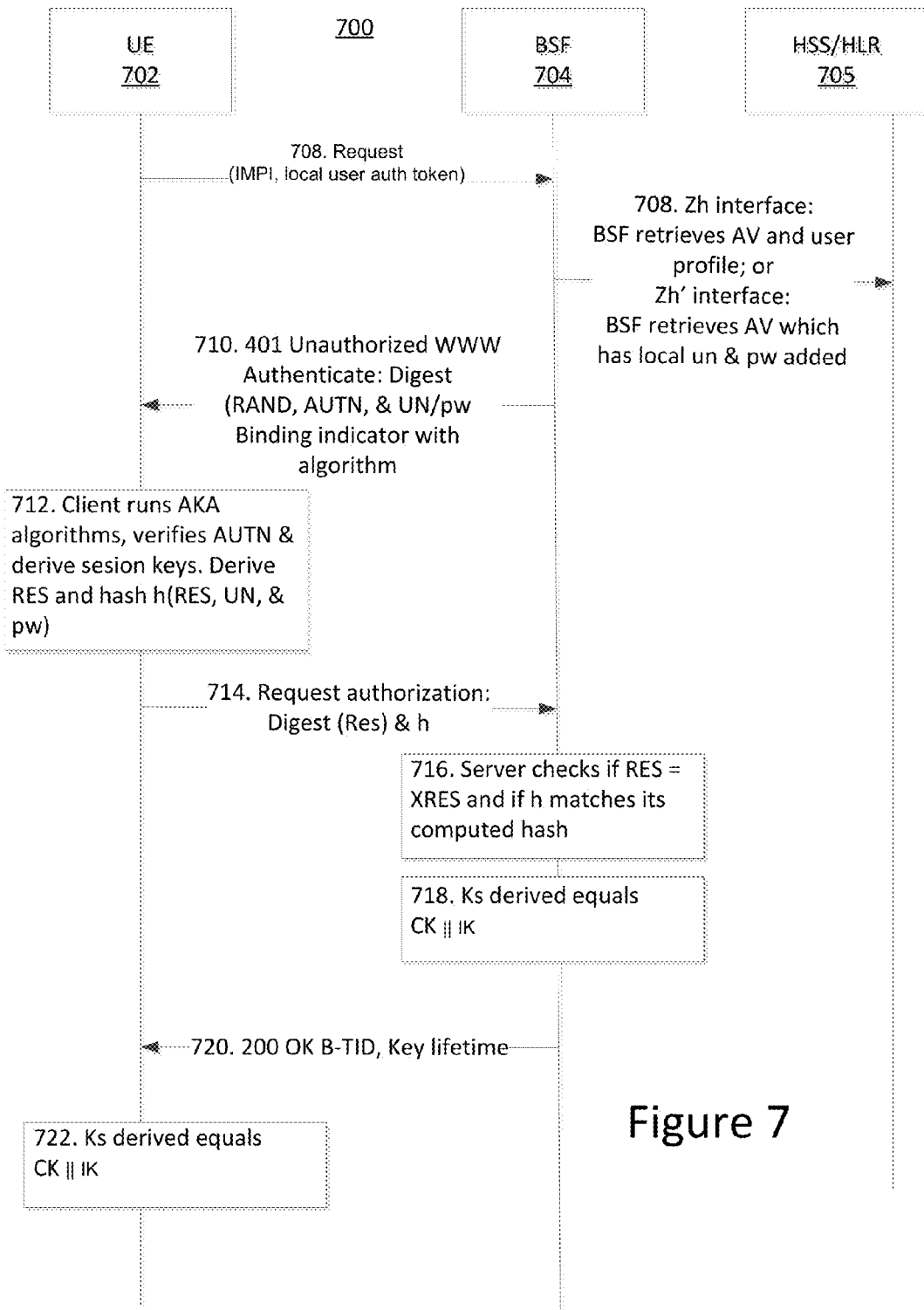
FIG. 7 is a flow diagram for binding user authentication credentials with a GBA according to an example embodiment.

In yet another example embodiment, network controlled user authentication may be bound to a modified GBA protocol. For example, the user authentication credentials may be integrated with the subscription credentials which the device smartcard (e.g., UICC) may share with the HSS in the mobile network. Referring to step 624 in FIG. 6, the network may participate in authenticating the user. Such a user authentication may be integrated into the bootstrapping. For example, the resulting bootstrapping protocol may describe a modified GBA protocol in which the user authentication credentials are bound to the device authentication response and the bootstrapped key generation. In an example embodiment, network participation in user authentication in this manner may be driven by NAF assurance level requirements. FIG. 7 illustrates the details of an exemplary bootstrapping protocol. Other details are provided in 3GPP TS 33.220: "Generic Authentication Architecture (GAA); Generic Bootstrapping Architecture", which may be referred to herein as TS 33.220 and which is incorporated by reference as if set forth in its entirety herein.

FIG. 7 is a flow diagram of a system 700 for binding user authentication credentials with a GBA according to an example embodiment. Referring to FIG. 7, system 700 includes an UE 702, an BSF 704, and an HSS/HLR 705 which communicate via a network. The parameters denoted as RAND, AUTN, XRES, RES CK, IK are defined in TS 33.220. In accordance with the illustrated embodiment, at 706, the UE 702 makes a request to the BSF 704 to bootstrap with an HTTP message. Such a message may comprise the subscriber identity (IMPI) and a token. The token may provide an indication to the BSF 704 that the user has been authenticated locally (e.g., at the UE 702). At 708, the BSF 704 may use the IMPI to retrieve an authentication vector (AV) and GBA user security settings from the HSS 705. The AV may comprise the RAND, AUTN, XRES, CK, IK, and the user input identity (e.g., username) and the user's PIN or password. At 710, the BSF 704 forwards the RAND, AUTN, and a binding indicator and binding algorithm (e.g., hash algorithm) to the UE 702, for example, in the 401 message. The binding indicator may inform the UE 702 that the bootstrapping response should bind the user input credentials (e.g., username and password, denoted UN and PW respectively) with the RES. At 712, the UE 702 may calculate the RES, CK, IK, and a hash h(RES, UN, PW) which may fulfill the binding request from the BSF 704. At 714, the UE may send an HTTP request which may comprise the RES and h(RES, UN, PW) to the BSF 704. At 716, in accordance with the illustrated embodiment, the BSF 704 may authenticate the UE 702 by comparing the RES to the XRES and determining whether there is a match. User authentication may be validated by determining a match between the hash value, h(RES, UN, PW) and the corresponding hash calculated by the BSF 704. Steps 718, 720, and 722 may implemented as described in TS 33.220.

In an example embodiment, the Ks may comprise an Authentications Binding Key derived from CK, IK and User Credentials. In an alternative embodiment, a binding mechanism is used that may involve user and subscriber credentials in the derivation of an Authentication Binding Key, Ks. For example, a concatenation such as CK∥IK∥USER_CREDENTIALS may produce a key which may exceed the 256 bit size. USER_CREDENTIALS may be a combination of Username and Password. A hash that compresses the larger bit string down to 256 bits may be used to derive the key. For example, a SHA-256 hash function may be used. For a function, the following may be obtained for the derived key: ABK=Ks=SHA-256(CK∥IK∥USER_CREDENTIALS). The BSF may indicate to the NAF that the Ks, from which the Ks_NAF may be derived, comprises a binding key employing CK, IK, and user credentials.

In another example variant, user authentication may be based on EAP while GBA may be used for Device Authentication. For example, the MSK_u may comprise the MSK derived as part of the EAP authentication and may comprise a length of 512 bits. The EAP authentication protocols used may be EAP-TTLS, for example, or any other EAP that uses Knowledge-based authentication. The Device authentication may be carried out using GBA. The Ks_NAF that is generated as part of Device Authentication may be 256 bits long. In an example embodiment, the Ks_NAF may be cryptographically generated to comprise a length of 512 bits. The MSK_u and the MSK_d=Ks_NAF may be bound together.

In yet another variant, user authentication may be based on GBA Digest while an EAP-based protocol may be used for device authentication. For example, the device authentication may be based on EAP-SIM/AKA/AKA', EAP-TLS, and EAP-FAST may be used as the EAP Authentication protocols. In such an embodiment, MSK_u=Ks=KDF (H(A1), "GBA_Digest_Ks", TLS_MK_Extr, RESP) may be generated as part of the GBA digest protocol, while MSK_d=MSK may be derived as part of the EAP protocol.

In yet another embodiment, user authentication may be carried out using EAP-TTLS and/or other EAP protocol that biometric values may be used for user authentication, while EAP-SIM, EAP-AKA, EAP-AKA' or other EAP methods that can be used for device authentication may be used for performing device authentication.

It will be understood that Open ID, Open ID Connect, or the like may be used for user authentication, while device authentication may be based on GBA or EAP protocols used for device authentication, although embodiments may vary as desired. In an example embodiment, a user id and password is used for authentication with an OpenID Identity Provider (OP), while GBA is used for device authentication. Other variants based on Open ID which use EAP-SIM/AKA protocols to authenticate the device and a separate Open ID/Open ID Connect protocol performs the user authentication. Thus, such user and device authentications may be carried out and bound together for two factor authentication.

Figure 8A:
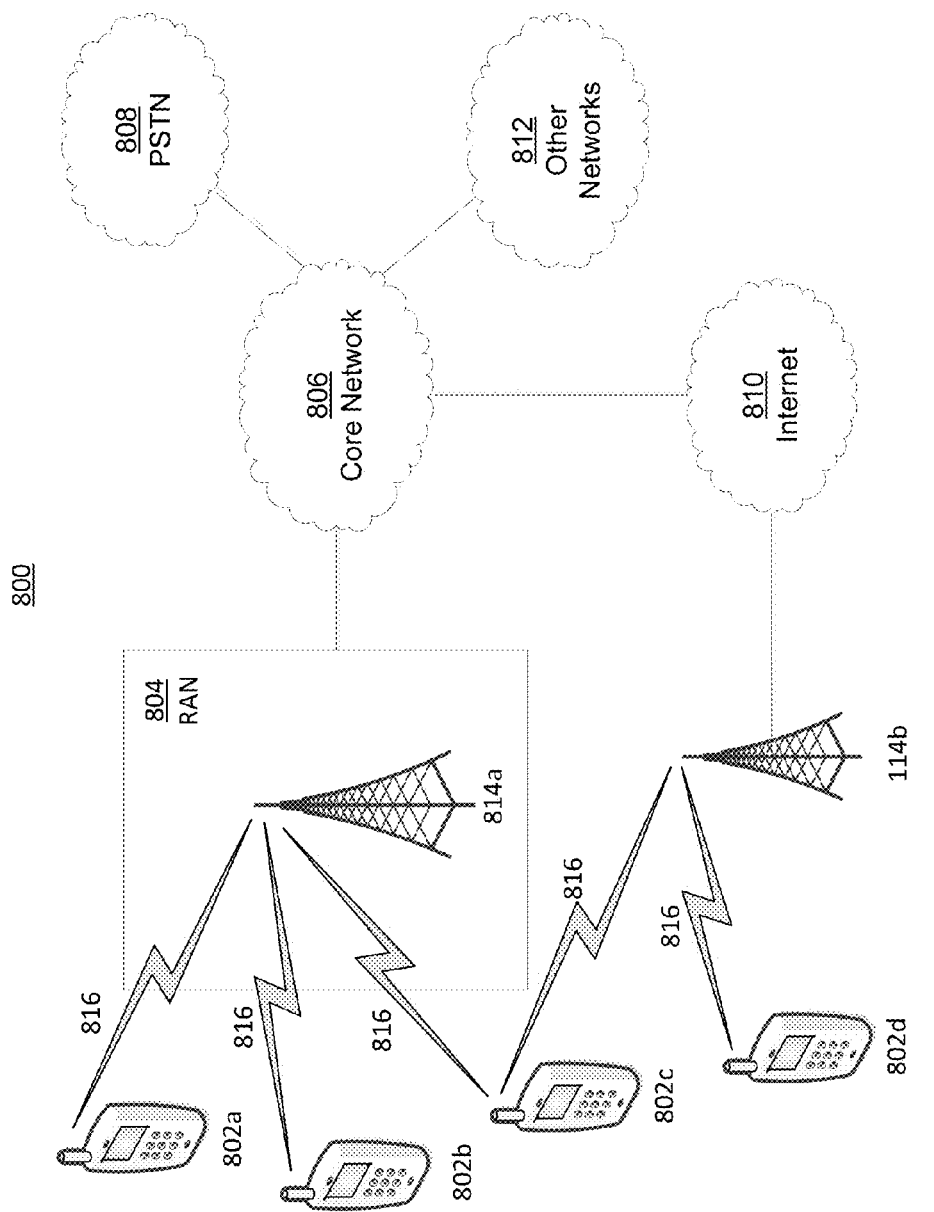
FIG. 8A is a system diagram of an example communications system in which one or more disclosed embodiments may be implemented.

FIG. 8A is a diagram of an example communications system 800 in which one or more disclosed embodiments may be implemented. The communications system 800 may be a multiple access system that provides content, such as voice, data, video, messaging, broadcast, etc., to multiple wireless users. The communications system 800 may enable multiple wireless users to access such content through the sharing of system resources, including wireless bandwidth. For example, the communications systems 800 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 8A, the communications system 800 may include wireless transmit/receive units (WTRUs) 802a, 802b, 802c, 802d, a radio access network (RAN) 804, a core network 806, a public switched telephone network (PSTN) 808, the Internet 810, and other networks 812, though it will be appreciated that the disclosed embodiments contemplate any number of WTRUs, base stations, networks, and/or network elements. Each of the WTRUs 802a, 802b, 802c, 802d may be any type of device configured to operate and/or communicate in a wireless environment. By way of example, the WTRUs 802a, 802b, 802c, 802d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 800 may also include a base station 814a and a base station 814b. Each of the base stations 814a, 814b may be any type of device configured to wirelessly interface with at least one of the WTRUs 802a, 802b, 802c, 802d to facilitate access to one or more communication networks, such as the core network 806, the Internet 810, and/or the networks 812. By way of example, the base stations 814a, 814b may be a base transceiver station (BTS), a Node-B, an eNode B, a Home Node B, a Home eNode B, a site controller, an access point (AP), a wireless router, and the like. While the base stations 814a, 814b are each depicted as a single element, it will be appreciated that the base stations 814a, 814b may include any number of interconnected base stations and/or network elements.

The base station 814a may be part of the RAN 804, which may also include other base stations and/or network elements (not shown), such as a base station controller (BSC), a radio network controller (RNC), relay nodes, etc. The base station 814a and/or the base station 814b may be configured to transmit and/or receive wireless signals within a particular geographic region, which may be referred to as a cell (not shown). The cell may further be divided into cell sectors. For example, the cell associated with the base station 814a may be divided into three sectors. Thus, in an embodiment, the base station 814a may include three transceivers, i.e., one for each sector of the cell. In an embodiment, the base station 814a may employ multiple-input multiple output (MIMO) technology and, therefore, may utilize multiple transceivers for each sector of the cell.

The base stations 814a, 814b may communicate with one or more of the WTRUs 802a, 802b, 802c, 802d over an air interface 816, which may be any suitable wireless communication link (e.g., radio frequency (RF), microwave, infrared (IR), ultraviolet (UV), visible light, etc.). The air interface 816 may be established using any suitable radio access technology (RAT).

More specifically, as noted above, the communications system 800 may be a multiple access system and may employ one or more channel access schemes, such as CDMA, TDMA, FDMA, OFDMA, SC-FDMA, and the like. For example, the base station 814a in the RAN 804 and the WTRUs 802a, 802b, 802c may implement a radio technology such as Universal Mobile Telecommunications System (UMTS) Terrestrial Radio Access (UTRA), which may establish the air interface 816 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 814a and the WTRUs 802a, 802b, 802c may implement a radio technology such as Evolved UMTS Terrestrial Radio Access (E-UTRA), which may establish the air interface 816 using Long Term Evolution (LTE) and/or LTE-Advanced (LTE-A).

In other embodiments, the base station 814a and the WTRUs 802a, 802b, 802c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 814b in FIG. 8A may be a wireless router, Home Node B, Home eNode B, femto cell base station, or access point, for example, and may utilize any suitable RAT for facilitating wireless connectivity in a localized area, such as a place of business, a home, a vehicle, a campus, and the like. In an embodiment, the base station 814b and the WTRUs 802c, 802d may implement a radio technology such as IEEE 802.11 to establish a wireless local area network (WLAN). In an embodiment, the base station 814b and the WTRUs 802c, 802d may implement a radio technology such as IEEE 802.15 to establish a wireless personal area network (WPAN). In yet another embodiment, the base station 814b and the WTRUs 802c, 802d may utilize a cellular-based RAT (e.g., WCDMA, CDMA2000, GSM, LTE, LTE-A, etc.) to establish a picocell or femtocell. As shown in FIG. 8A, the base station 814b may have a direct connection to the Internet 810. Thus, the base station 814b may not be required to access the Internet 810 via the core network 806.

The RAN 804 may be in communication with the core network 806, which may be any type of network configured to provide voice, data, applications, and/or voice over internet protocol (VoIP) services to one or more of the WTRUs 802a, 802b, 802c, 802d. For example, the core network 806 may provide call control, billing services, mobile location-based services, pre-paid calling, Internet connectivity, video distribution, etc., and/or perform high-level security functions, such as user authentication. Although not shown in FIG. 8A, it will be appreciated that the RAN 804 and/or the core network 806 may be in direct or indirect communication with other RANs that employ the same RAT as the RAN 804 or a different RAT. For example, in addition to being connected to the RAN 804, which may be utilizing an E-UTRA radio technology, the core network 806 may also be in communication with another RAN (not shown) employing a GSM radio technology.

The core network 806 may also serve as a gateway for the WTRUs 802a, 802b, 802c, 802d to access the PSTN 808, the Internet 810, and/or other networks 812. The PSTN 808 may include circuit-switched telephone networks that provide plain old telephone service (POTS). The Internet 810 may include a global system of interconnected computer networks and devices that use common communication protocols, such as the transmission control protocol (TCP), user datagram protocol (UDP) and the internet protocol (IP) in the TCP/IP internet protocol suite. The networks 812 may include wired or wireless communications networks owned and/or operated by other service providers. For example, the networks 812 may include another core network connected to one or more RANs, which may employ the same RAT as the RAN 804 or a different RAT.

Some or all of the WTRUs 802a, 802b, 802c, 802d in the communications system 800 may include multi-mode capabilities, i.e., the WTRUs 802a, 802b, 802c, 802d may include multiple transceivers for communicating with different wireless networks over different wireless links. For example, the WTRU 802c shown in FIG. 8A may be configured to communicate with the base station 814a, which may employ a cellular-based radio technology, and with the base station 814b, which may employ an IEEE 802 radio technology.

Figure 8B:
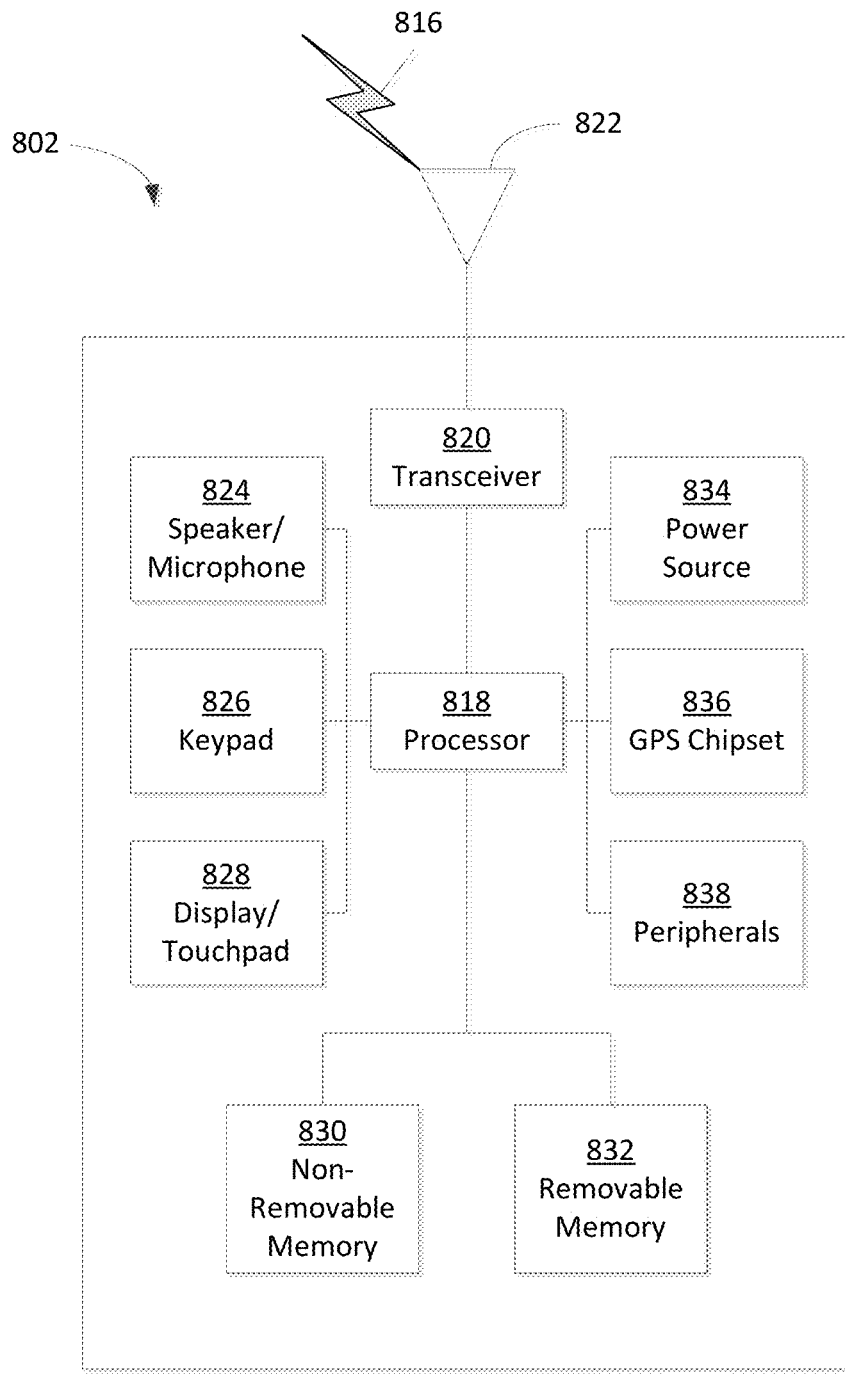
FIG. 8B is a system diagram of an example wireless transmit/receive unit (WTRU) that may be used within the communications system illustrated in FIG. 8A.

FIG. 8B is a system diagram of an example WTRU 802. As shown in FIG. 8B, the WTRU 802 may include a processor 818, a transceiver 820, a transmit/receive element 822, a speaker/microphone 824, a keypad 826, a display/touchpad 828, non-removable memory 830, removable memory 832, a power source 834, a global positioning system (GPS) chipset 836, and other peripherals 838. It will be appreciated that the WTRU 802 may include any sub-combination of the foregoing elements while remaining consistent with an embodiment.

The processor 818 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 818 may perform signal coding, data processing, power control, input/output processing, and/or any other functionality that enables the WTRU 802 to operate in a wireless environment. The processor 818 may be coupled to the transceiver 820, which may be coupled to the transmit/receive element 822. While FIG. 8B depicts the processor 818 and the transceiver 820 as separate components, it will be appreciated that the processor 818 and the transceiver 820 may be integrated together in an electronic package or chip. The processor 818 may perform application-layer programs (e.g., browsers) and/or radio access-layer (RAN) programs and/or communications. The processor 818 may perform security operations such as authentication, security key agreement, and/or cryptographic operations, such as at the access-layer and/or application layer for example.

In an example embodiment, the WTRU 802 comprises a processor 818 and memory coupled to the processor. The memory comprises executable instructions that when executed by the processor cause the processor to effectuate operations associated with provisioning credentials on-demand.

The transmit/receive element 822 may be configured to transmit signals to, or receive signals from, a base station (e.g., the base station 814*a*) over the air interface 816. For example, in an embodiment, the transmit/receive element 822 may be an antenna configured to transmit and/or receive RF signals. In an embodiment, the transmit/receive element 822 may be an emitter/detector configured to transmit and/or receive IR, UV, or visible light signals, for example. In yet an embodiment, the transmit/receive element 822 may be configured to transmit and receive both RF and light signals. It will be appreciated that the transmit/receive element 822 may be configured to transmit and/or receive any combination of wireless signals.

In addition, although the transmit/receive element 822 is depicted in FIG. 8B as a single element, the WTRU 802 may include any number of transmit/receive elements 822. More specifically, the WTRU 802 may employ MIMO technology. Thus, in an embodiment, the WTRU 802 may include two or more transmit/receive elements 822 (e.g., multiple antennas) for transmitting and receiving wireless signals over the air interface 816.

The transceiver 820 may be configured to modulate the signals that are to be transmitted by the transmit/receive element 822 and to demodulate the signals that are received by the transmit/receive element 822. As noted above, the WTRU 802 may have multi-mode capabilities. Thus, the transceiver 820 may include multiple transceivers for enabling the WTRU 802 to communicate via multiple RATs, such as UTRA and IEEE 802.11, for example.

The processor 818 of the WTRU 802 may be coupled to, and may receive user input data from, the speaker/microphone 824, the keypad 826, and/or the display/touchpad 828 (e.g., a liquid crystal display (LCD) display unit or organic light-emitting diode (OLED) display unit). The processor 818 may also output user data to the speaker/microphone 824, the keypad 826, and/or the display/touchpad 828. In addition, the processor 818 may access information from, and store data in, any type of suitable memory, such as the non-removable memory 830 and/or the removable memory 832. The non-removable memory 830 may include random-access memory (RAM), read-only memory (ROM), a hard disk, or any other type of memory storage device. The removable memory 832 may include a subscriber identity module (SIM) card, a memory stick, a secure digital (SD) memory card, and the like. In other embodiments, the processor 818 may access information from, and store data in, memory that is not physically located on the WTRU 802, such as on a server or a home computer (not shown).

The processor 818 may receive power from the power source 834, and may be configured to distribute and/or control the power to the other components in the WTRU 802. The power source 834 may be any suitable device for powering the WTRU 802. For example, the power source 834 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 818 may also be coupled to the GPS chipset 836, which may be configured to provide location information (e.g., longitude and latitude) regarding the current location of the WTRU 802. In addition to, or in lieu of, the information from the GPS chipset 836, the WTRU 802 may receive location information over the air interface 816 from a base station (e.g., base stations 814*a*, 814*b*) and/or determine its location based on the timing of the signals being received from two or more nearby base stations. It will be appreciated that the WTRU 802 may acquire location information by way of any suitable location-determination method while remaining consistent with an embodiment.

The processor 818 may further be coupled to other peripherals 838, which may include one or more software and/or hardware modules that provide additional features, functionality and/or wired or wireless connectivity. For example, the peripherals 838 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8C:
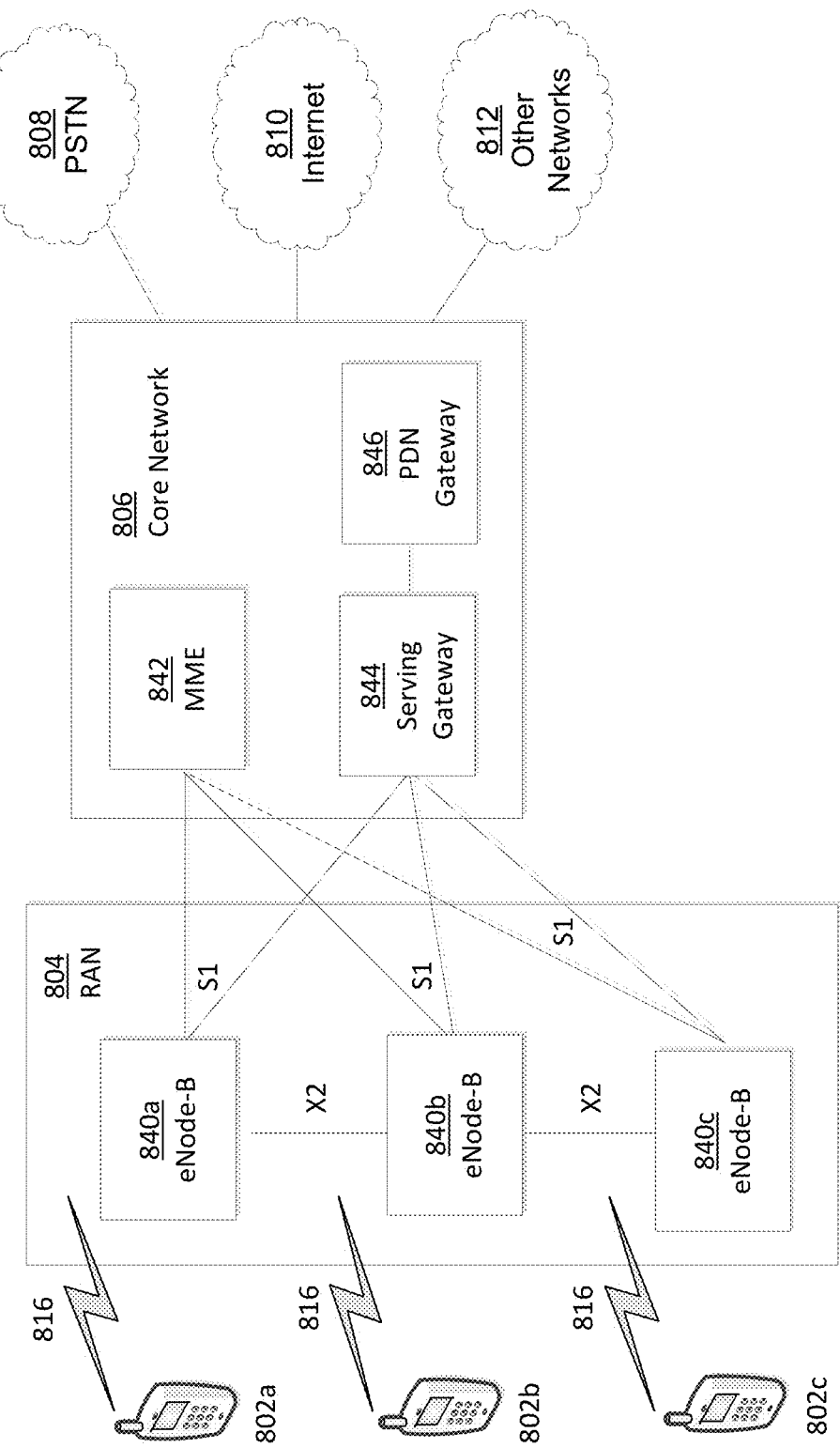
FIG. 8C is a system diagram of an example radio access network and an example core network that may be used within the communications system illustrated in FIG. 8A.

FIG. 8C is a system diagram of the RAN 804 and the core network 806 according to an embodiment. As noted above, the RAN 804 may employ a UTRA radio technology to communicate with the WTRUs 802*a*, 802*b*, 802*c* over the air interface 816. The RAN 804 may also be in communication with the core network 806. As shown in FIG. 8C, the RAN 804 may include Node-Bs 840*a*, 840*b*, 840*c*, which may each include one or more transceivers for communicating with the WTRUs 802*a*, 802*b*, 802*c* over the air interface 816. The Node-Bs 840*a*, 840*b*, 840*c* may each be associated with a particular cell (not shown) within the RAN 804. The RAN 804 may also include RNCs 842*a*, 842*b*. It will be appreciated that the RAN 804 may include any number of Node-Bs and RNCs while remaining consistent with an embodiment.

As shown in FIG. 8C, the Node-Bs 840*a*, 840*b* may be in communication with the RNC 842*a*. Additionally, the Node-B 840*c* may be in communication with the RNC 842*b*. The Node-Bs 840*a*, 840*b*, 840*c* may communicate with the respective RNCs 842*a*, 842*b* via an Iub interface. The RNCs 842*a*, 842*b* may be in communication with one another via an Iur interface. Each of the RNCs 842*a*, 842*b* may be configured to control the respective Node-Bs 840*a*, 840*b*, 840*c* to which it is connected. In addition, each of the RNCs 842*a*, 842*b* may be configured to carry out and/or support other functionality, such as outer loop power control, load control, admission control, packet scheduling, handover control, macrodiversity, security functions, data encryption, and the like.

The core network 806 shown in FIG. 8C may include a media gateway (MGW) 844, a mobile switching center (MSC) 846, a serving GPRS support node (SGSN) 848, and/or a gateway GPRS support node (GGSN) 850. While each of the foregoing elements are depicted as part of the core network 806, it will be appreciated that any one of these elements may be owned and/or operated by an entity other than the core network operator.

The RNC 842a in the RAN 804 may be connected to the MSC 846 in the core network 806 via an IuCS interface. The MSC 846 may be connected to the MGW 844. The MSC 846 and the MGW 844 may provide the WTRUs 802a, 802b, 802c with access to circuit-switched networks, such as the PSTN 808, to facilitate communications between the WTRUs 802a, 802b, 802c and traditional land-line communications devices.

The RNC 842a in the RAN 804 may also be connected to the SGSN 848 in the core network 806 via an IuPS interface. The SGSN 848 may be connected to the GGSN 850. The SGSN 848 and the GGSN 850 may provide the WTRUs 802a, 802b, 802c with access to packet-switched networks, such as the Internet 810, to facilitate communications between and the WTRUs 802a, 802b, 802c and IP-enabled devices.

As noted above, the core network 806 may also be connected to the networks 812, which may include other wired or wireless networks that are owned and/or operated by other service providers.

Although features and elements are described above in particular combinations, each feature or element can be used alone or in any combination with the other features and elements. Additionally, the embodiments described herein are provided for exemplary purposes only. For example, while embodiments may be described herein using OpenID and/or SSO authentication entities and functions, similar embodiments may be implemented using other authentication entities and functions. Furthermore, the embodiments described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of authenticating a user of a wireless transmit/receive unit (WTRU), the method comprising, at the WTRU:
   obtaining, from an access control entity, an assurance level associated with a user authentication strength that is required to access a resource controlled by the access control entity;
   generating an assertion based on the assurance level that is obtained, the assertion comprising an indication of a freshness of an authentication of the user, and an indication of a strength of the authentication of the user, the indication of the freshness based on a time that the authentication of the user occurred; and
   based on the assertion as compared to the user authentication assurance level that is required, receiving access to the resource via the WTRU.

2. The method as recited in claim 1, the method further comprising:
   obtaining a measure of a strength of a WTRU authentication; and
   generating the assertion further based on the WTRU authentication strength measure.

3. The method as recited in claim 2, wherein the assertion comprises an indication of a freshness of the WTRU authentication.

4. The method as recited in claim 1, wherein the assertion comprises a plurality of user authentication factors.

5. The method as recited in claim 2, wherein the assertion comprises a plurality of WTRU authentication factors.

6. The method as recited in claim 1, wherein the assertion is a negative assertion and the received access, based on the negative assertion, is a limited access.

7. In a system comprising a wireless transmit/receive unit (WTRU) and an access control entity (ACE) which communicate via a network, a method of authenticating a user of the WTRU and the WTRU, the method comprising:
   requesting access to a service controlled by the ACE;
   providing a user assertion, to the ACE, associated with the user, wherein the user assertion indicates a result of an authentication between the user and a user authenticator and assertion function (UAAF), and wherein the user assertion comprises a user authentication assurance level;
   providing a device assertion, to the ACE, associated with a device identity of the WTRU, wherein the device assertion indicates a result of an authentication between the WTRU and a device authenticator and assertion function (DAAF), and wherein the device assertion comprises a device authentication assurance level;
   binding the user assertion with the device assertion to create a bounded assertion; and
   sending the bounded assertion to the ACE to receive access to the service.

8. The method as recited in claim 7, wherein the user assertion further comprises an indication of a user authentication freshness level.

9. The method as recited in claim 7, wherein the device assertion further comprises an indication of a device authentication freshness level.

10. The method as recited in claim 7, wherein the bounded assertion comprises a combined result of the user authentication assurance level and the device authentication assurance level.

11. The method as recited in claim 7, wherein the user assertion comprises a negative user assertion, and wherein the negative user assertion indicates that the result of the authentication between the user and the UAAF is negative, the method further comprising:
   in response to the negative user assertion, receiving a limited access or no access to the service.

12. The method as recited in claim 7, wherein the device assertion comprises a negative device assertion, wherein the negative device assertion indicates that the result of the authentication between the WTRU and the DAAF is negative, the method further comprising:
   in response to the negative device assertion, receiving a limited access or no access to the service.

13. The method as recited in claim 7, wherein the bounded assertion comprises a negative bounded assertion, and wherein the negative bounded assertion indicates that at least one of the results of the authentication between the user and the UAAF or the authentication between the WTRU and the DAAF is negative, the method further comprising:
 in response to the negative bounded assertion, receiving a limited access or no access to the service.

14. The method as recited in claim 7, wherein the device assertion comprises a positive device assertion and the user assertion comprises a positive user assertion, and wherein the positive device assertion indicates that the WTRU is authenticated with the DAAF, and wherein the positive user assertion indicates that the user is authenticated with the UAAF, the method further comprising:
 in response to the bounded assertion, receiving a limitless access to the service.

15. The method as recited in claim 7, the method further comprising:
 if at least one of the device authentication assurance level, the device authentication freshness level, the user authentication assurance level, and the user authentication freshness level are not within a respective acceptable range, receiving a limited access or no access to the service.

16. The method as recited in claim 7, wherein the UAAF resides on the WTRU and the DAAF resides on a server of the network.

17. The method as recited in claim 7, wherein the UAAF and the DAAF are co-located.

18. The method as recited in claim 7, the method further comprising:
 if at least one of the device authentication assurance level and the device authentication freshness level are not with a respective acceptable range, re-authenticating the WTRU with the DAAF.

19. The method recited in claim 7, the method further comprising:
 if at least one of the user authentication assurance level and the user authentication freshness level are not with within a respective acceptable range, re-authenticating the user with the UAAF.

20. The method recited in claim 18, wherein each respective acceptable range is determined by a policy of a service provider that provides the service.

21. The method as recited in claim 19, wherein each respective acceptable range is determined by a policy of a service provider that provides the service.

22. The method recited in claim 7, wherein the UAAF and the DAAF are bound together into a single authenticator and assertion function (AAF).

23. The method as recited in claim 7, wherein the DAAF and the ACE are co-located.

24. The method as recited in claim 7, wherein the result of the authentication between the user and the UAAF is based on at least one of one or more authentication factors, the one or more authentication factors comprising information indicative of knowledge of the user, one or more physiological characteristics of the user, and one or more behavioral characteristics of the user.

25. The method as recited in claim 10, the method further comprising:
 storing a user authentication freshness level, the user authentication assurance level, the device authentication freshness level, and the device authentication assurance level; and
 based on at least one of the stored levels, receiving a limited access to the service.

26. A wireless transmit/receive unit (WTRU) having a user, the WTRU comprising:
 a memory comprising executable instructions; and
 a processor in communications with the memory, the instructions, when executed by the processor, cause the processor to effectuate operations comprising:
  obtaining, from an access control entity, an assurance level associated with a user authentication strength that is required to access a resource controlled by the access control entity;
  generating an assertion based on the assurance level that is obtained, the assertion comprising an indication of a freshness of an authentication of the user, and an indication of a strength of the authentication of the user, the indication of the freshness based on a time that the authentication of the user occurred; and
  based on the assertion as compared to the user authentication assurance level that is required, receiving access to the resource via the WTRU.

27. The WTRU as recited in claim 26, wherein the processor is further configured to execute the instructions to perform operations comprising:
 obtaining a measure of a strength of a WTRU authentication; and
 generating the assertion further based on the WTRU authentication strength measure.

28. The WTRU as recited in claim 27, wherein the assertion comprises an indication of a freshness of the WTRU authentication.

29. The WTRU as recited in claim 26, wherein the assertion comprises a plurality of user authentication factors.

30. The WTRU as recited in claim 27, wherein the assertion comprises a plurality of WTRU authentication factors.

31. The WTRU as recited in claim 26, wherein the assertion is a negative assertion and the received access, based on the negative assertion, is a limited access or no access to the resource.

* * * * *